US008647185B2

(12) United States Patent
Nishimura et al.

(10) Patent No.: US 8,647,185 B2
(45) Date of Patent: Feb. 11, 2014

(54) GAME MACHINE, STORAGE MEDIUM STORING COMPUTER PROGRAM, AND CONTROL METHOD OF CONTROLLING COMPUTER

(75) Inventors: Yoshitaka Nishimura, Minato-ku (JP); Tetsuhiro Honjo, Minato-ku (JP); Aoi Tagami, Minato-ku (JP); Kazuha Hayashi, Minato-ku (JP)

(73) Assignee: Konami Digital Entertainment Co., Ltd., Minato-ku, Tokyo (JP)

( * ) Notice: Subject to any disclaimer, the term of this patent is extended or adjusted under 35 U.S.C. 154(b) by 0 days.

(21) Appl. No.: 13/590,433

(22) Filed: Aug. 21, 2012

(65) Prior Publication Data

US 2013/0053114 A1 Feb. 28, 2013

(30) Foreign Application Priority Data

Aug. 24, 2011 (JP) ................................ 2011-183089

(51) Int. Cl.
*A63F 9/24* (2006.01)
(52) U.S. Cl.
USPC ...................... 463/7; 463/35; 463/37; 463/43
(58) Field of Classification Search
USPC ............. 463/7, 16, 20, 35, 37, 43; 700/90–93
See application file for complete search history.

(56) References Cited

U.S. PATENT DOCUMENTS

| 7,320,643 | B1 * | 1/2008 | Brosius et al. | 463/37 |
| 7,625,284 | B2 * | 12/2009 | Kay et al. | 463/31 |
| 8,444,486 | B2 * | 5/2013 | Kay et al. | 463/31 |
| 2005/0124401 | A1 * | 6/2005 | Izuno et al. | 463/7 |
| 2007/0197290 | A1 * | 8/2007 | Ueshima | 463/36 |
| 2008/0280680 | A1 * | 11/2008 | Dutilly et al. | 463/36 |
| 2009/0088249 | A1 * | 4/2009 | Kay et al. | 463/37 |

(Continued)

FOREIGN PATENT DOCUMENTS

| JP | 2001-096061 A | 4/2001 |
| JP | 2011-30872 A | 2/2011 |

OTHER PUBLICATIONS

Japanese Office Action with English Translation—Issued on Aug. 27, 2013.

*Primary Examiner* — William Brewster
*Assistant Examiner* — Jason Skaarup
(74) *Attorney, Agent, or Firm* — Howard & Howard Attorneys PLLC

(57) ABSTRACT

A game machine with a display, a storage medium storing a computer program, and a control method of controlling a computer to display a reference mark moving from a start position to an arrival position along a predetermined path is displayed on a game screen. The game machine comprises a path rotating device that rotates the predetermined path on a predetermined rotation axis during a game based on a predetermined condition. The predetermined path may vary by rotational angle, orbital distance from a rotational center, rotation timing, rotation timing data, rotational angle data, and angle specifying data. The game machine may also include a an audio output device, a music data storage device, and a music reproducing device that reproduces the music through the audio output device based on the music data, and wherein the music data timing is translated into operation timing sequence data for the rotation of the predetermined path. The storage medium stores a computer program in order to cause a computer incorporated into the game machine above to invoke the same. The control method above comprises the step necessary to cause the rotation of the rotating device detailed above.

14 Claims, 16 Drawing Sheets

(56) References Cited

U.S. PATENT DOCUMENTS

| | | | |
|---|---|---|---|
| 2010/0009750 A1* | 1/2010 | Egozy et al. | 463/35 |
| 2010/0029386 A1* | 2/2010 | Pitsch et al. | 463/35 |
| 2010/0062846 A1* | 3/2010 | Orlinsky et al. | 463/30 |
| 2011/0034247 A1* | 2/2011 | Masuda et al. | 463/35 |

* cited by examiner

GAME MACHINE, STORAGE MEDIUM STORING COMPUTER PROGRAM, AND CONTROL METHOD OF CONTROLLING COMPUTER

CROSS-REFERENCE TO RELATED APPLICATIONS

The present application claims the benefit of patent application number 2011-183089, filed in Japan on Aug. 24, 2011, the subject matter of which is hereby incorporated herein by reference.

TECHNICAL FIELD

The present invention relates to a game machine in which a reference mark moving along a predetermined path from a start position to an arrival position is displayed on a game screen, a storage medium storing a computer program used thereof, and a control method of controlling a computer.

BACKGROUND ART

A music game has been known in which a note bar corresponding to a rhythm sound is displayed along a predetermined path, and operation timing is guided by moving the note bar toward a reference line so that the note bar can match the reference line corresponding to the current time at the operation timing (for example, see Japanese Patent Application Laid-Open No. 2001-96061).
Patent Literature 1: Japanese Patent Application Laid-Open No. 2001-96061.

SUMMARY OF INVENTION

Technical Problem

In the game machine disclosed in Patent Literature 1, the operation timing is guided such that the note bar matches the reference line. Further, the guided operation timing is compared with actual operation timing on a simulated guitar used as an operation device, and the actual operation timing is evaluated. However, the position at which the note bar is displayed, a moving path of the note bar, and the like are constant. For this reason, habituation of a player may occur, and thus amusement of a game may be lowered.

In this regard, it is an object of the present invention to provide a game machine capable of suppressing habituation of a player, a storage medium storing a computer program used thereof, and a control method of controlling a computer.

Solution to Problem

A game machine of the present invention is a game machine in which a reference mark (OJ) moving from a start position (UP) to an arrival position (DP) along a predetermined path (TL) is displayed on a game screen (40), wherein the game machine comprises: a path rotating device (15) that rotates the predetermined path on a predetermined rotation axis (RL) during a game based on a predetermined condition.

According to the present invention, a predetermined path rotates based on a predetermined condition. Through this operation, it is possible to change a display position of a reference mark, a display range, a moving direction, or the like, and thus it is possible to change a player's line of sight, operation, or the like. Alternatively, this change can be used as a rendering effect. As a result, the player's habituation can be suppressed, and amusement of a game can be improved.

In an embodiment of the game machine of the present invention, the game machine may further comprise a path position changing device (15) that changes, with the rotation of the predetermined path, the position at which the predetermined path is arranged so that the predetermined path moves around a predetermined center position (CP). In this case, it is possible to give a change such as position movement in addition to rotation, and thus the player's habituation can be further suppressed.

A method of rotating the predetermined path is not limited, and a method of causing the predetermined path to orbit the predetermined center position is not limited. For example, in an embodiment of the present invention in which the position of the predetermined path changes, the path position changing device may change the position at which the predetermined path is arranged according to a rotation angle of the predetermined path so that the predetermined path returns to an original position at which movement starts in a state in which the predetermined path has rotated one revolution. Alternatively, the path rotating device may rotate the predetermined path in a direction (RR) corresponding to an orbiting direction (RD) in which the predetermined path moves around the predetermined center position so as to orbit. In this case, since the rotating direction corresponds to the orbiting direction, a rendering effect can be improved.

In an embodiment of the game machine of the present invention, the predetermined rotation axis may extend along the predetermined path. In this case, it is possible to cause an extending direction of the predetermined path to match with before and after rotation.

The predetermined center position may be arranged at any position. For example, in an embodiment of the present invention in which the predetermined center position is used, the predetermined center position may be arranged, on an extension line of the predetermined path, at the side of the start position.

In an embodiment of the game machine of the present invention, the game machine may further comprise a rotation timing data storage device (20) that stores rotation timing data (32) in which rotation timing to rotate the predetermined path is described, and wherein the path rotating device rotates the predetermined path at the rotation timing described in the rotation timing data. In this case, it is possible to designate the rotation timing using the rotation timing data.

In an embodiment of the game machine of the present invention, the game machine may further comprise an execution condition data storage device (20) that stores execution condition data (32) in which execution condition information specifying an execution condition about whether or not to rotate the predetermined path is described, and wherein the path rotating device rotates the predetermined path using the execution condition specified by the execution condition information as the predetermined condition when the execution condition is satisfied. In this case, it is possible to designate a condition to rotate the predetermined path using the execution condition information.

In an embodiment of the game machine of the present invention, the game machine may further comprises an angle specifying data storage device (20) that stores angle specifying data (32) in which angle specifying information specifying a rotation angle of the predetermined path is described, and wherein the path rotating device rotates the predetermined path until a rotation angle specified by the angle specifying information based on the angle specifying data. In this case, it is possible to designate an angle to rotate the predetermined path using the angle specifying data.

In an embodiment of the game machine of the present invention, the game machine may further comprises a rotating direction data storage device (20) that stores rotating direction data (32) in which rotating direction information specifying a rotating direction of the predetermined path is described, and wherein the path rotating device rotates the predetermined path in a direction specified by the rotating direction information based on the rotating direction data. In this case, it is possible to designate a direction to rotate the predetermined path using the rotating direction data.

In an embodiment of the game machine of the present invention, the game machine may further comprise: an input device (3) including at least one operating unit (13); a sequence data storage device (20) that stores sequence data (32) in which operation timing to perform an operation on the operating unit during the game is described; and an operation guide device (15) that guides the operation timing by determining the operation timing included in a predetermined time range from a current time on the game to a future based on the sequence data, displaying the reference mark in association with each determined operation timing, displaying a current time mark (KL) corresponding to the current time and the reference mark along the predetermined path on the game by an arrangement of a time order, and causing a relative change along the predetermined path between the reference mark and the current time mark so that a distance between the reference mark and the current time mark decreases with a decrement in a time difference between each piece of operation timing and the current time. In this case, since the predetermined path is used to guide an operation, it is easy to attract the player's attention. For this reason, it is possible to impress the player on a change through rotation of the predetermined path. As a result, the player's habituation can be further suppressed.

In an embodiment of the game machine of the present invention, a specific operation on the operating unit may be employed as the predetermined condition, and the path rotating device rotates the predetermined path when the specific operation is executed. In this case, since whether or not to execute rotation depends on the specific operation, motivation on the operation can be made.

In an embodiment of the game machine of the present invention, the game machine may further comprise: an audio output device (4) that reproduces and outputs a sound; a music data storage device (20) that stores music data (29) to reproduce music; and a music reproducing device (15) that reproduces the music through the audio output device based on the music data, and wherein timing during reproduction of the music is described in the sequence data as the operation timing.

In this case, it is possible to provide a music game capable of suppressing the player's habituation.

A storage medium according to the present invention stores a computer program for a game machine being configured to cause a computer, which is incorporated into a game machine in which a reference mark moving from a start position to an arrival position along a predetermined path is displayed on a game screen, to function as: a path rotating device that rotates the predetermined path on a predetermined rotation axis during a game based on a predetermined condition.

Further, a control method of controlling a computer of the present invention is a control method of controlling a computer incorporated into a game machine in which a reference mark moving from a start position to an arrival position along a predetermined path is displayed on a game screen, wherein the control method of controlling the computer comprises the step: a path rotating step that rotates the predetermined path on a predetermined rotation axis during a game based on a predetermined condition. It is possible to actualize a game machine of the present invention by executing the computer program stored in the storage medium of the present invention or the control method of controlling a computer of the present invention.

In addition, in the above description, in order to help with understanding of the present invention, reference numerals of the accompanying drawings are represented in parentheses. However, this does not cause the present invention to be limited to the embodiments illustrated in the drawings.

Advantageous Effects of Invention

As described above, according to the present invention, it is possible to change a display position of a reference mark, a display range, a moving direction, a moving distance, and the like through rotation of a predetermined path, and thus it is possible to change a player's line of sight, operation, or the like. As a result, the player's habituation can be suppressed.

DESCRIPTION OF EMBODIMENTS

Figure 1:
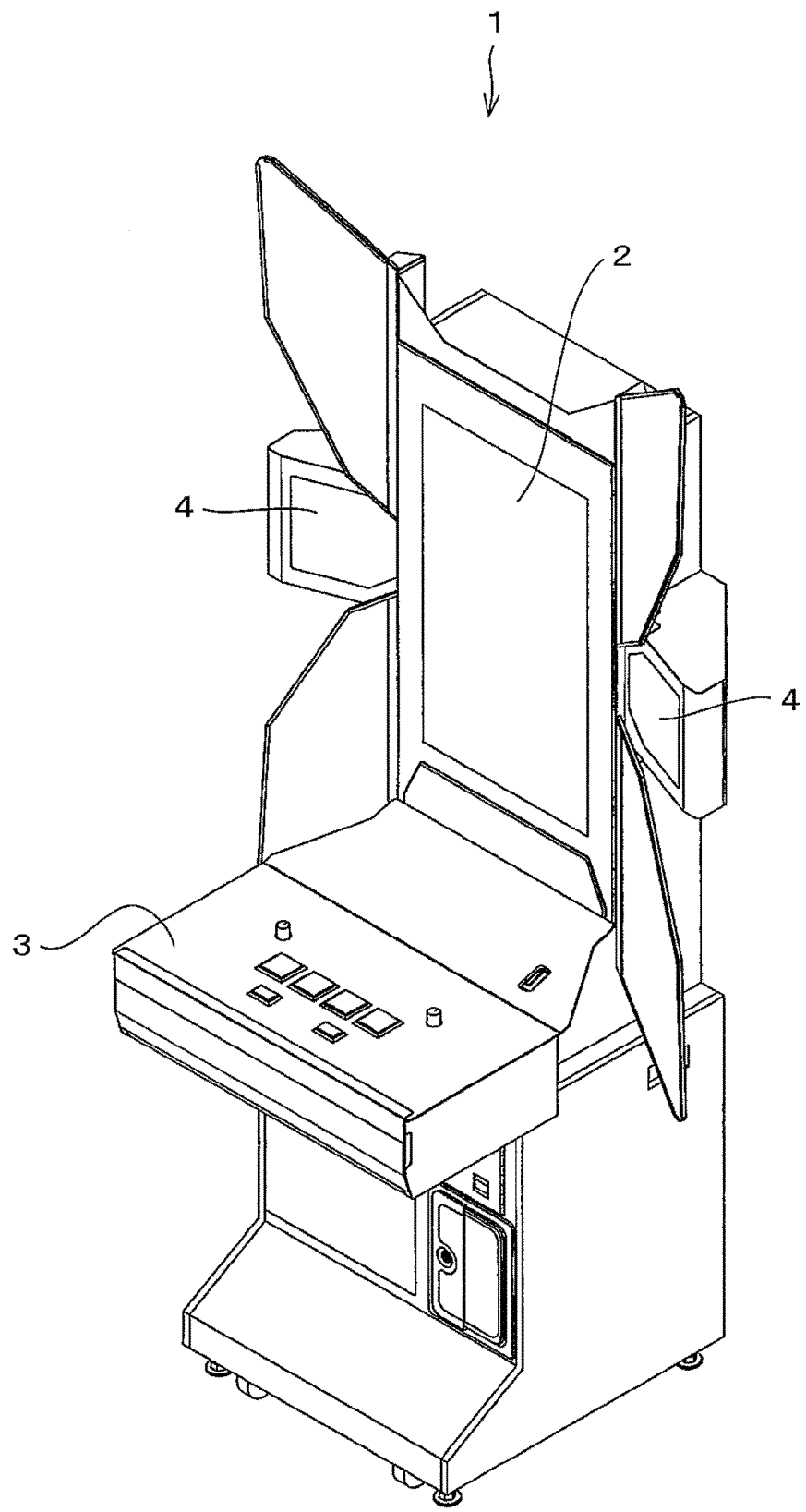
FIG. 1 is a diagram illustrating an external appearance of a game machine according to an embodiment of the present invention.

Hereinafter, a game machine according to an embodiment of the present invention will be described. FIG. 1 is a diagram illustrating an external appearance of a game machine according to an embodiment of the present invention. As illustrated in FIG. 1, a game machine 1 includes a monitor 2, a control panel 3 as an input device, and two speakers 4 as an audio output device. Each speaker 4 is configured to emit a light and changes a color of emitted light during play. In addition, the game machine 1 includes various input devices and output devices, disposed in a typical game machine for business use, such as a volume operating switch, a power switch, and a power lamp in addition to the control panel 3. However, the input devices and output devices are not illustrated in FIG. 1. Also, a plurality of game machines 1 may be arranged in a row and used.

Figure 2:
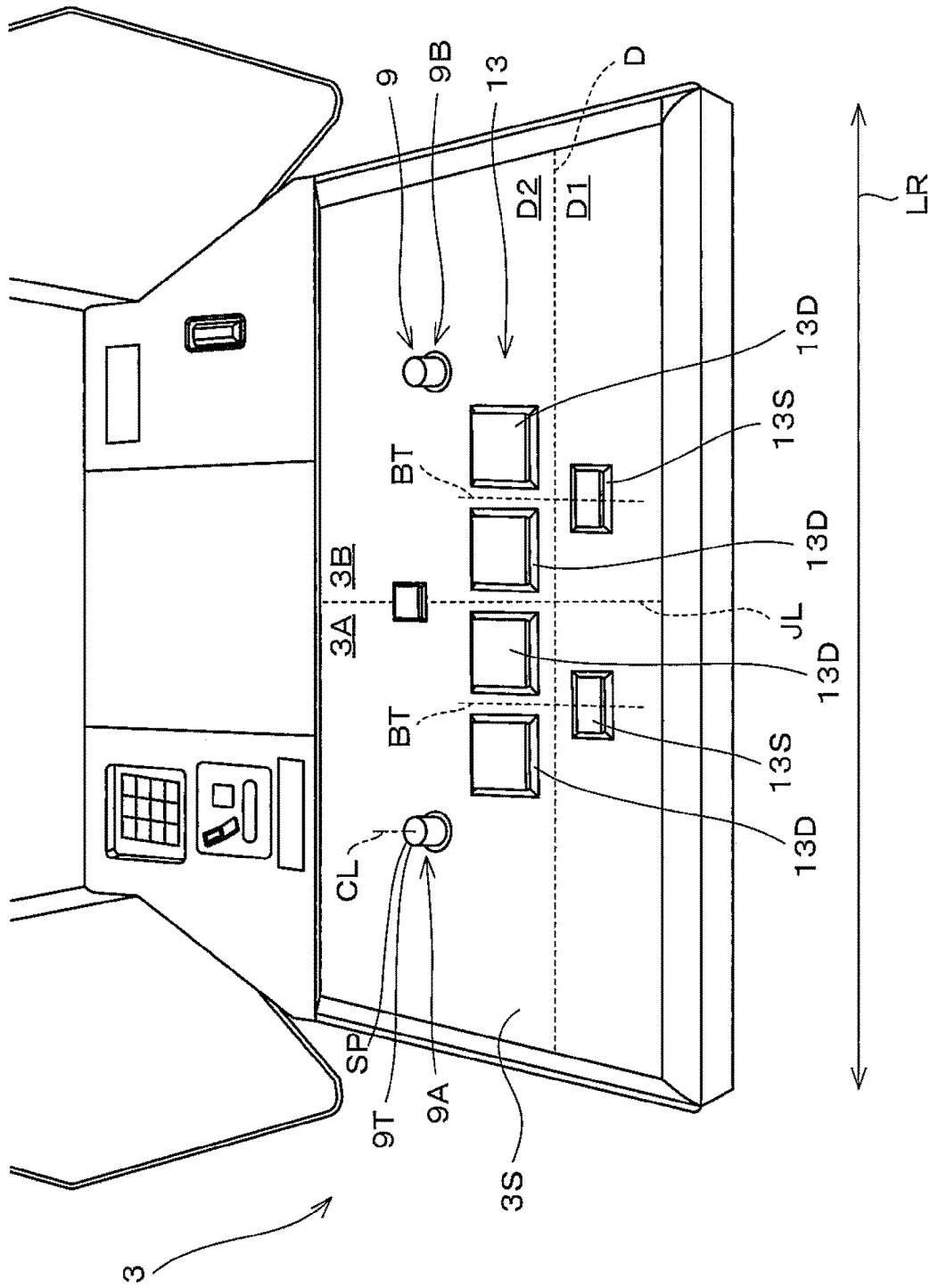
FIG. 2 is an enlarged view of a control panel illustrated in FIG. 1.

FIG. 2 is an enlarged view of the control panel 3 illustrated in FIG. 1. As illustrated in FIG. 2, the control panel 3 includes two volume controllers 9 functioning as a rotational operating member and six buttons 13 functioning as an operating unit. The six buttons 13 are classified into four large buttons 13D and two small buttons 13S smaller than the large buttons 13D. Further, a surface 3S is divided into a first area D1 and a second area D2. A dotted line D illustrated in FIG. 2 represents the boundary between the first area D1 and the second area D2. As illustrated in FIG. 2, the four large buttons 13D are arranged on the second area D2 above the two small buttons 13S, and the two small buttons are arranged on the first area D1 below the first area D1. Further, the four large buttons 13D are arranged to form a line in a horizontal direction. Meanwhile, the two small buttons 13S are also arranged to form a line in the horizontal direction.

Furthermore, the six buttons 13 are arranged at vertically symmetrical positions with reference to a longitudinal line JL that divides the surface 3S of the control panel 3 in two in a left-right direction LR. The longitudinal line JL vertically divides the first area D1 and the second area D2 in half. In other words, the control panel 3 is divided into a left area 3A and a right area 3B by the longitudinal line JL, and the three buttons 13 are arranged on each of the areas 3A and 3B. And, the three buttons 13 included in the left area 3A and the three buttons 13 included in the right area 3B are arranged to be vertically symmetrical to each other with reference to the longitudinal line JL. Also, each of the small buttons 13S is arranged on an intermediate line BT, which is defined midway between the two large buttons 13D included in each of the areas 3A and 3B, in the left-right direction LR. As described above, a predetermined positional relation is formed between one small button and the two large buttons 13D included in each of the left and right areas 3A and 3B. In addition, the dotted lines such as the longitudinal line JL and the intermediate line BT illustrated in FIG. 2 are imaginary lines, and are not formed in the actual control panel 3.

The volume controller 9 is arranged in the second area D2. Further, the two volume controllers 9 are also classified into a left volume controller 9A included in the left area 3A and a right volume controller 9B included in the right area 3B by the longitudinal line JL. The volume controllers 9A and 9B are also arranged to be vertically symmetrical to each other with reference to the longitudinal line JL. Further, the volume controller 9 has a cylindrical shape having a center line CL. The volume controller 9 includes a shaft portion (not illustrated) that extends in a direction intersecting with the surface 3S along the center line CL and a knob portion 9T fixedly attached to the shaft portion. The shaft portion is disposed to rotate around the center line CL in both left and right directions. In other words, the volume controller 9 is configured to rotate around the center line CL both counterclockwise and clockwise. The player rotationally operates the volume controller 9 in both left and right directions through the knob portion 9T. Further, the position of an outer circumferential portion SP of the knob portion 9T changes with the rotational operation. The outer circumferential portion SP of the knob portion 9T functions as a reference portion of the present invention.

Figure 3:
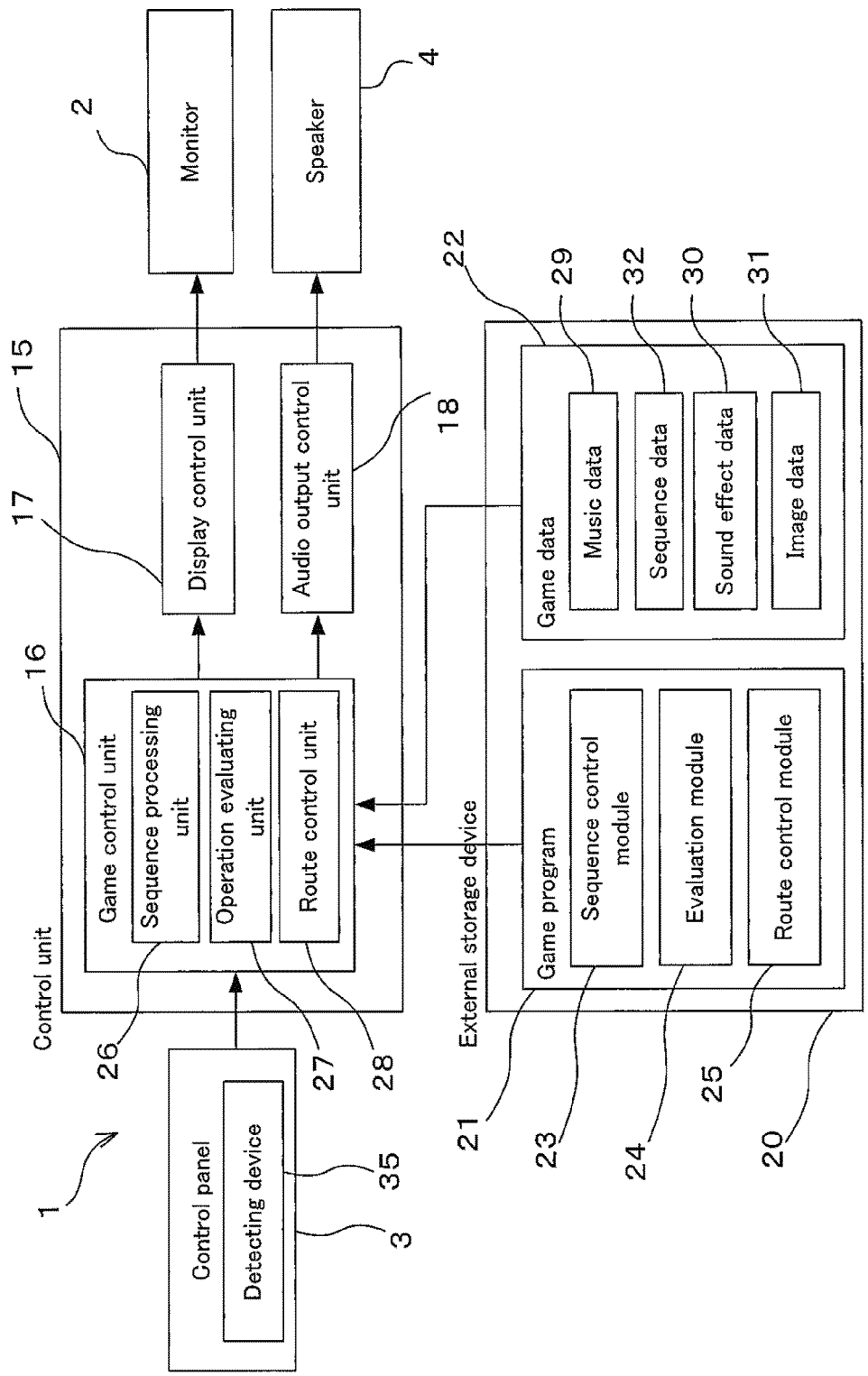
FIG. 3 is a functional block diagram of a game machine.

FIG. 3 is a functional block diagram of the game machine 1. As illustrated in FIG. 3, a control unit 15 as a computer is provided in the game machine 1. Further, the control panel 3, the monitor 2, and the speaker 4 are connected to the control unit 15. The control unit 15 includes a game control unit 16 functioning as a main control entity, a display control unit 17 and an audio output control unit 18 that operate according to an output from the game control unit 16. The game control unit 16 is configured as a unit in which a microprocessor is combined with various peripheral devices (for example, a random access memory (RAM) and a read only memory (ROM)) necessary for an operation of the microprocessor.

The display control unit 17 renders an image corresponding to image data given from the game control unit 16 in a frame buffer, and outputs a video signal corresponding to the rendered image to the monitor 2, so that a predetermined image is displayed on the monitor 2. The audio output control unit 18 generates an audio reproduction signal corresponding to audio reproduction data given from the game control unit 16, and outputs the audio reproduction signal to the speaker 4, so that a predetermined sound (including a song or the like) is reproduced through the speaker 4.

Further, an external storage device 20 is connected to the game control unit 16. As the external storage device 20, there is used a storage medium that maintains data after power is not supplied such as a non-volatile semiconductor memory including an electrically erasable programmable read only memory (EEPROM) and the like, or an optical storage medium including a digital versatile disc read only memory (DVD-ROM), a compact disk read only memory (CD-ROM) and the like.

The external storage device 20 stores a game program 21 and game data 22. The game program 21 is a computer program necessary to execute a music game according to a predetermined process by the game machine 1. The game program 21 includes a sequence control module 23 for implementing a function related to the present invention, an evaluation module 24, and a route control module 25. When the game machine 1 starts up, the game control unit 16 executes an operation program stored in an internal storage device thereof, and executes various processes necessary to operate as the game machine 1.

Subsequently, the game control unit 16 sets an environment for executing a music game according to the game program 21. As the sequence control module 23 of the game program 21 is executed by the game control unit 16, a sequence processing unit 26 is generated in the game control unit 16. Further, as the evaluation module 24 of the game program 21 is executed by the game control unit 16, an operation evaluating unit 27 is generated in the game control unit 16. Furthermore, as the route control module 25 of the game program 21 is executed by the game control unit 16, a route control unit 28 is generated in the game control unit 16. The sequence processing unit 26, the operation evaluating unit 27, and the route control unit 28 are logical devices implemented by a combination of computer hardware and a computer program.

The sequence processing unit 26 executes a music game process of instructing the player to perform an operation in time with reproduction of music (song) selected by the player, generating a rendering effect such as a sound effect in response to the player's operation, or the like. The operation evaluating unit 27 executes a process of evaluating the player's operation. Further, the route control unit 28 executes a process of changing a display aspect of a predetermined path displayed during a game. In addition, the game program 21 includes various program modules necessary to execute a music game in addition to the above-described modules 23, 24, and 25, and logical devices corresponding to the modules are generated in the game control unit 16. However, the logical devices are not illustrated in the drawings.

The game data 22 includes a variety of data which should be referred to when a music game is executed according to the game program 21. For example, the game data 22 includes music data 29, sound effect data 30, and image data 31. The music data 29 is data necessary to reproduce music which is a target of a game through the speaker 4. FIG. 3 illustrates a single kind of music data 29, but the player can actually select music to play from among a plurality of music. In the game data 22, a plurality of music data 29 which correspond to plural kinds of music, respectively, are recorded with information identifying music. The external storage device 20 functions as a music data storage device by storing the music data 29.

The sound effect data 30 is data in which each of plural kinds of sound effects to be output from the speaker 4 in response to the player's operation is recorded in association with a unique code for each sound effect. The sound effect includes various kinds of sounds in addition to music. As the sound effect data 30, sound effect data which correspond in number to a predetermined number of octaves may be prepared by changing a musical pitch for each kind. The image data 31 is data for causing a background image of a game screen, various objects, icons, and the like to be displayed on the monitor 2.

The game data 22 further includes sequence data 32. The sequence data 32 is data in which an operation to be instructed to the player is defined. At least one piece of sequence data 32 is prepared for the music data 29 of one piece of music. The details of the sequence data 32 will be described later.

The control panel 3 includes a detecting device 35 therein. The detecting device 35 detects an operation on the button 13 or an operation on the volume controller 9. Specifically, the detecting device 35 detects a rotation amount and a rotation direction of the volume controller 9 (or the position of the portion used as a reference in a circumferential direction) or the presence or absence of an operation of pushing the button 13. A detection result of the detecting device 35 is output to the game control unit 16 and then used for various processes executed by the game control unit 16. In addition, a well-known technique may be used as the detecting device 35. Further, two detecting devices 35 may be disposed for the volume controller 9 and for the button 13, respectively, and detecting devices 35 may be disposed for each of the six buttons 13 and for each of the two volume controllers 9, respectively.

Figure 4:
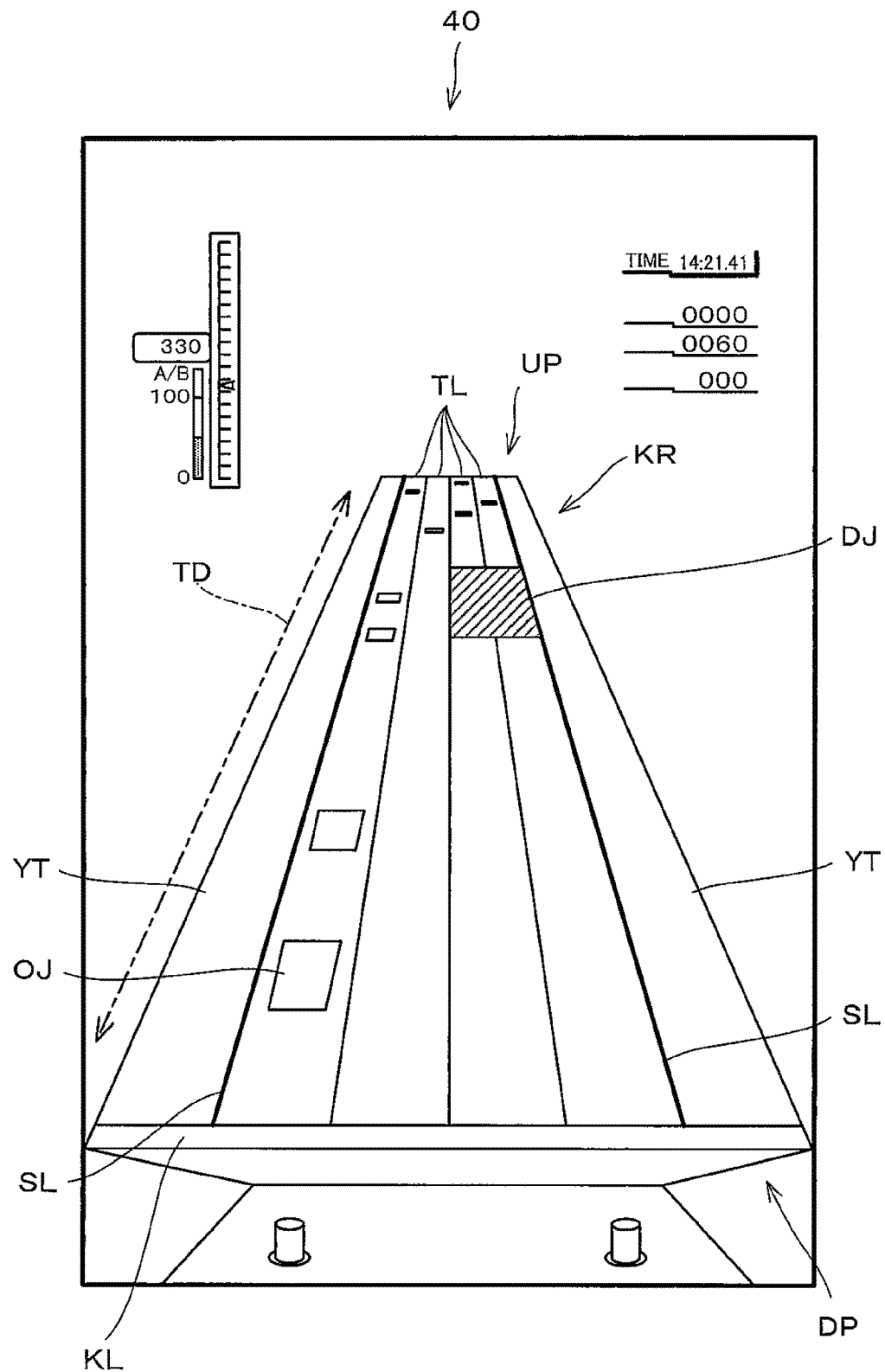
FIG. 4 is a diagram illustrating an example of a game screen.

Next, the outline of a music game executed by the game machine 1 will be described. In the game machine 1, there is executed a music game in which an appropriate operation corresponding to a reproduced music is evaluated. A concrete description will be made with reference to FIGS. 4 to 10. FIG. 4 is a diagram schematically illustrating an example of a game screen. As illustrated in FIG. 4, a game screen 40 includes a path display area KR. The path display area KR includes four tracks TL functioning as a predetermined path and two spare tracks YT. The four tracks TL extend from a back side (the upper side) UP as one side of the screen toward a front side (a lower side) DP as the other end so as to render a virtual three-dimensional (3D) space. The four tracks TL are arranged between two separator lines SL extending from the back side UP toward the front side DP of the screen. A depth direction TD in which the track TL extends is used as a time axis direction (a first direction). Further, the four tracks TL correspond to the four large buttons 13D, respectively. Furthermore, the spare track YT extending from the back side UP toward the front side DP of the screen is arranged at the side of each of the two separator lines SL.

A reference line KL is arranged at the lower side (the front side) of the path display area KR as a current time mark. The reference line KL extends in the form of a straight line so as to cross the four tracks TL in a left-right direction (a second direction). Further, an object OJ as a reference mark is displayed on each track TL at an appropriate timing. Further, a large object DJ is also similarly displayed at an appropriate timing. The large object DJ is arranged so as to straddle two left tracks or two right tracks among the four tracks TL. The object OJ and the large object DJ move from the back side UP toward the front side DP of the track TL. An appropriate operation is required to the player in time with arrival of the object OJ and the large object DJ at the reference line KL. Specifically, the player is required to perform an operation of pushing the large button 13D corresponding to the track TL on which the object OJ is arranged in time with arrival of the object OJ at the reference line KL. Further, when the large object DJ arrives at the reference line KL, the player is required to perform an operation of pushing the small button 13S positioned below the large button 13D corresponding to the two tracks TL which the large object DJ straddles. A difference between operation timing of the player and timing when the object OJ or the large object DJ arrives at the reference line KL is evaluated. In addition, in this embodiment, one end of the back side UP of the track TL functions as a start position, and the reference line KL functions as an arrival position.

Figure 5:
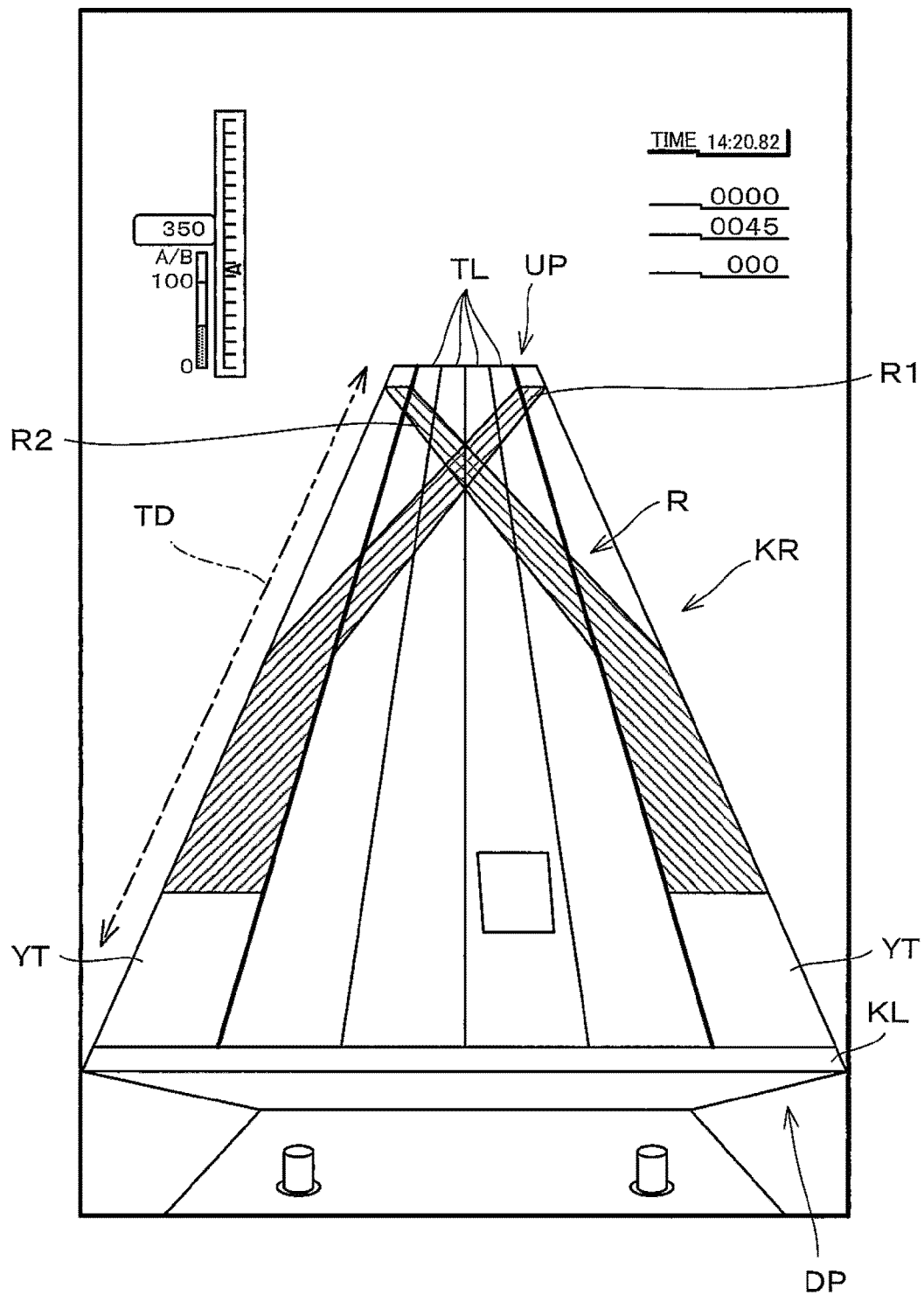
FIG. 5 is a diagram illustrating another example of a game screen.

An instruction path R is displayed on the path display area KR at appropriate timing. FIG. 5 is a diagram illustrating another example of a game screen. As illustrated in FIG. 5, a game screen 40R includes two instruction paths R. The two instruction paths R are arranged on the back side UP of the screen such that the two instruction paths R cross each other to draw a letter X. Specifically, one instruction path R1 extends from the spare track YT at the right side toward the spare track YT at the left side while obliquely crossing the four tracks TL, and the other instruction path R2 extends from the spare track YT at the left side toward the spare track YT at the right side while obliquely crossing the four tracks TL. And, the right instruction path R1 corresponds to the right volume controller 9B, and the left instruction path R2 corresponds to the left volume controller 9A.

Figure 6:
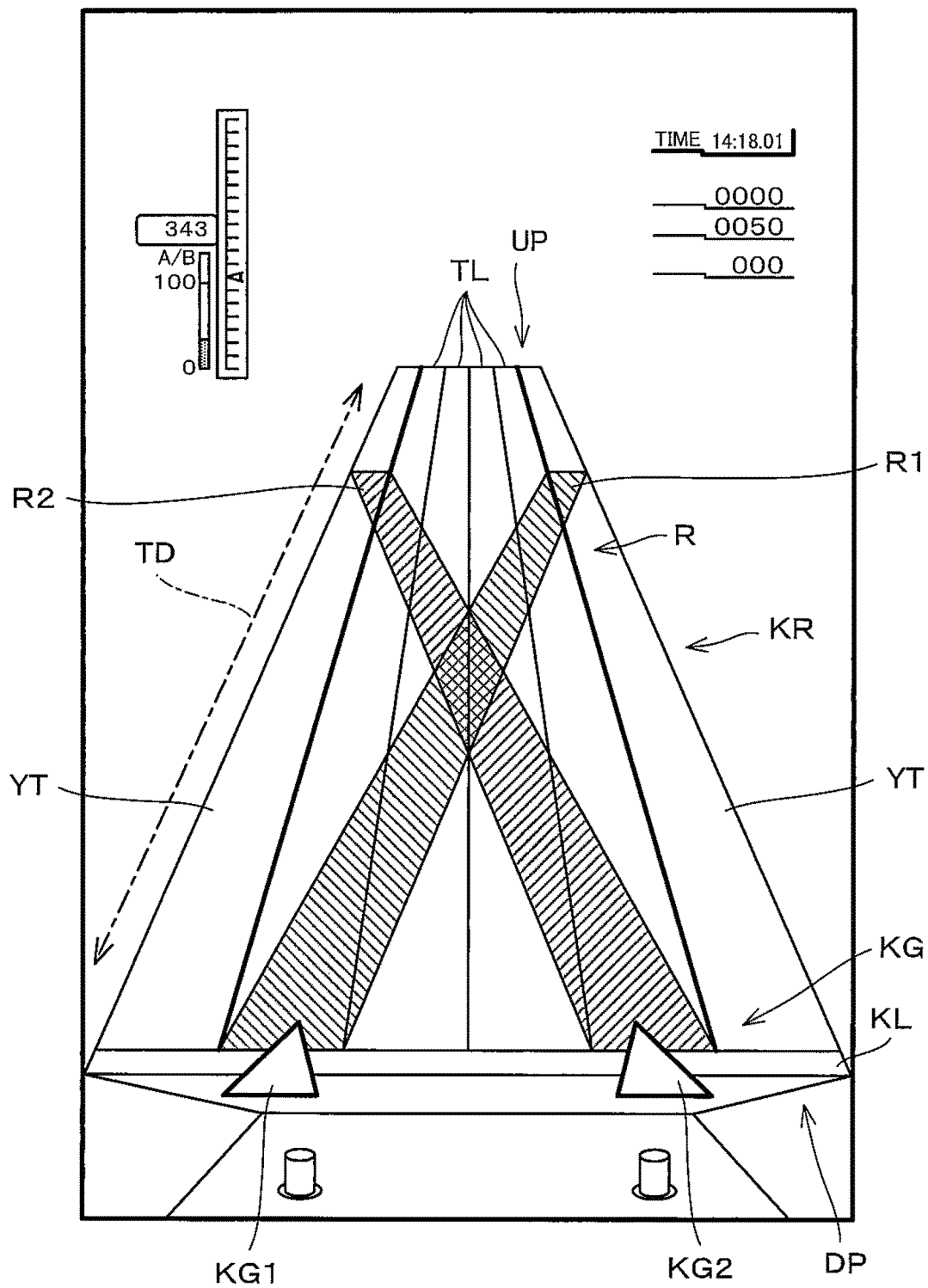
FIG. 6 is a diagram illustrating a game screen after a predetermined time elapsed from a game screen illustrated in FIG. 5.

The instruction path R also moves toward the reference line KL as a time passes. FIG. 6 is a diagram illustrating a game screen after a predetermined time elapsed from the game screen 40R illustrated in FIG. 5. As illustrated in FIG. 6, two cursors KG respectively corresponding to the two instruction paths R are displayed on the reference line KL in time with arrival of the instruction path R at the reference line KL. The cursor KG moves on the reference line KL in the left-right direction in response to the rotational operation on the volume controller 9. Specifically, the right cursor KG1 displayed corresponding to the right instruction path R1 moves in response to the rotational operation of the right volume controller 9B, and the left cursor KG2 displayed corresponding to the left instruction path R2 moves in response to the rotational operation of the left volume controller 9A.

The player is required to perform an operation not to lead each cursor KG astray outside each corresponding instruction path R. In other words, the player is required to perform an operation not to lead the right cursor KG1 astray outside the right instruction path R1 and not to lead the left cursor KG2 astray outside the left instruction path R2. When the cursor KG is led astray outside the instruction path R, a penalty is given. In contrast, when the cursor KG is not led astray outside the instruction path R until the instruction path R passes through the reference line KL, a privilege is given. In addition, for example, subtraction of a predetermined gauge in which a game ends when a value becomes zero or subtraction of an acquired score may be used as a penalty. Further, only a privilege may be given, and a penalty may not be given. For example, addition of a score or addition of a predetermined gauge may be used as a privilege.

Further, when a predetermined condition is satisfied, the path display area KR including the track TL starts to rotate on a predetermined rotation axis. Further, an arrangement position of the path display area KR moves to turn around a predetermined center position with the rotation. For example, a specific operation like when an appropriate operation is executed in time with arrival of the object OJ at the reference line KL is employed as a predetermined condition. In addition, for example, an operation causing the cursor KG to be not led astray the instruction path R from one end of the instruction path R to the other end thereof may be employed as a specific operation.

Figure 7:
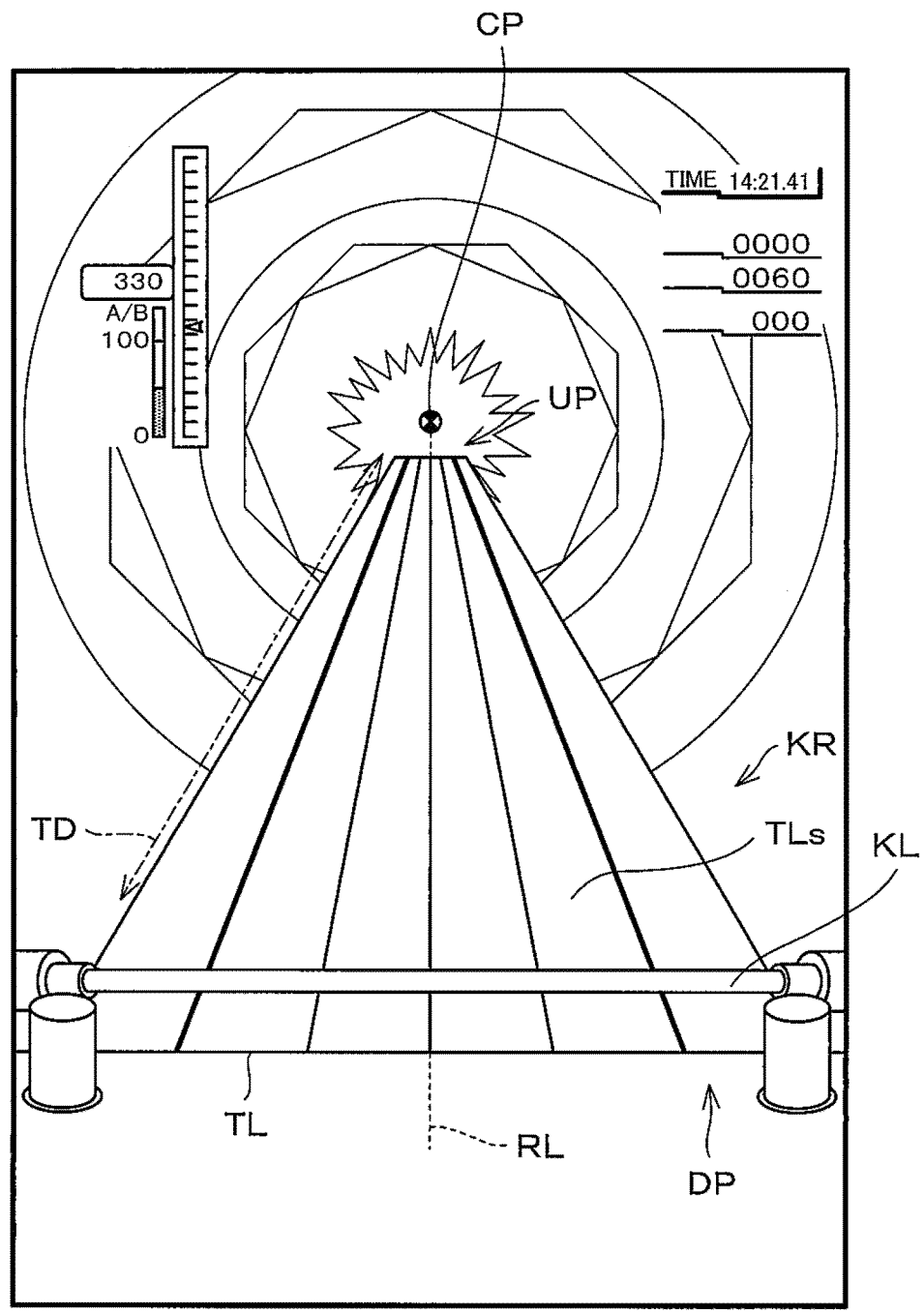
FIG. 7 is a diagram illustrating a game screen immediately before rotation of a track starts.

FIG. 7 is a diagram illustrating a game screen immediately before rotation of the track TL starts. In FIG. 7, a dotted line represents a rotation axis RL as a predetermined rotation axis. As illustrated in FIG. 7, before rotation starts, a surface TLs of the track TL is arranged to face upward as in the other drawings. Further, the rotation axis RL extends from the back side UP toward the front side DP in a direction in which the track TL extends, that is, in the depth direction TD. And, the rotation axis RL is arranged at the center in the left-right direction of the track TL, that is, at the center in a direction in which the four tracks TL are arranged. In addition, the rotation axis RL is not displayed on the actual game screen.

Meanwhile, a predetermined center position CP is arranged at the back side UP of the track TL, that is, at the side of the start position at which the object OJ or the like starts moving. Further, the predetermined center position CP is arranged on an extension line in which the track TL is further extended to the back side. Thus, the path display area KR including the track TL is positioned below the predetermined center position CP. Further, the surface TLs of the track TL is arranged to face the predetermined center position CP.

Figure 8:
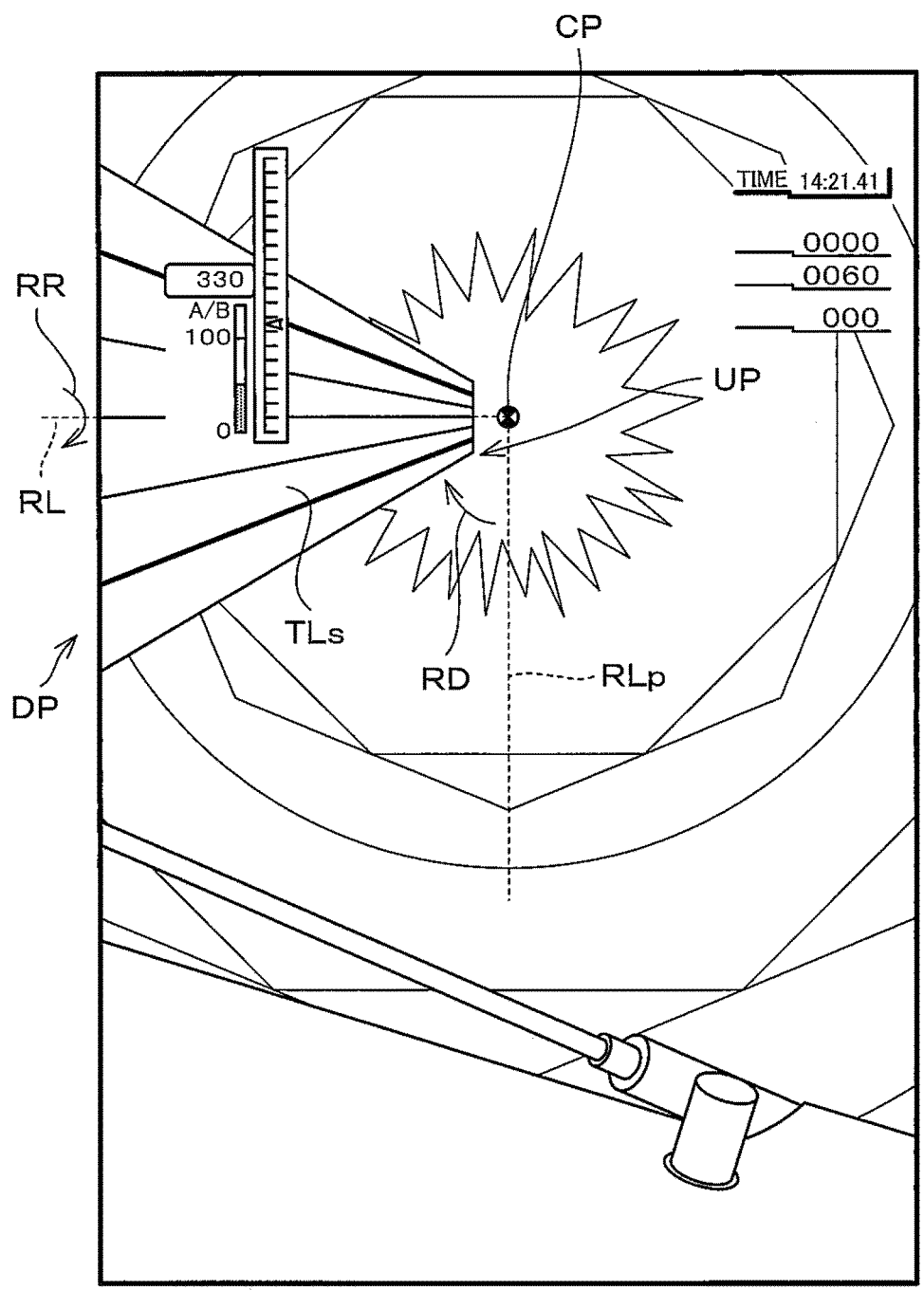
FIG. 8 is a diagram illustrating a game screen after a predetermined time elapsed from the state of FIG. 7.

FIG. 8 is a diagram illustrating a state of the track TL after a predetermined time elapsed from the state of FIG. 7. In FIG. 8, the position of the rotation axis RL of FIG. 7, that is, the position of the rotation axis RL before rotation starts is represented by a dotted line RLp. As illustrated in FIG. 8, the path display area KR including the track TL is arranged at the left side of the predetermined center position CP. Further, the rotation axis RL rotates around the predetermined center position CP in the clockwise direction RD and so moves about 90° compared to the dotted line RLp representing the position of the rotation axis RL before rotation. In other words, the position of the path display area KR rotates around the predetermined center position CP and so moves from the lower side position of the predetermined center position CP to the left side position thereof in the clockwise direction RD.

Further, the track TL included in the path display area KR is inclined by rotation. Specifically, the track TL rotates on the rotation axis RL up to about 90° in the right rotation direction RR, that is, rotates nearly a quarter turn. For this reason, the surface TLs of the track TL is inclined so as to face the right side at about 90° from an original state in which the surface TLs faces upward. Thus, the surface TLs of the track TL faces the predetermined center position CP side even after movement.

Figure 9:
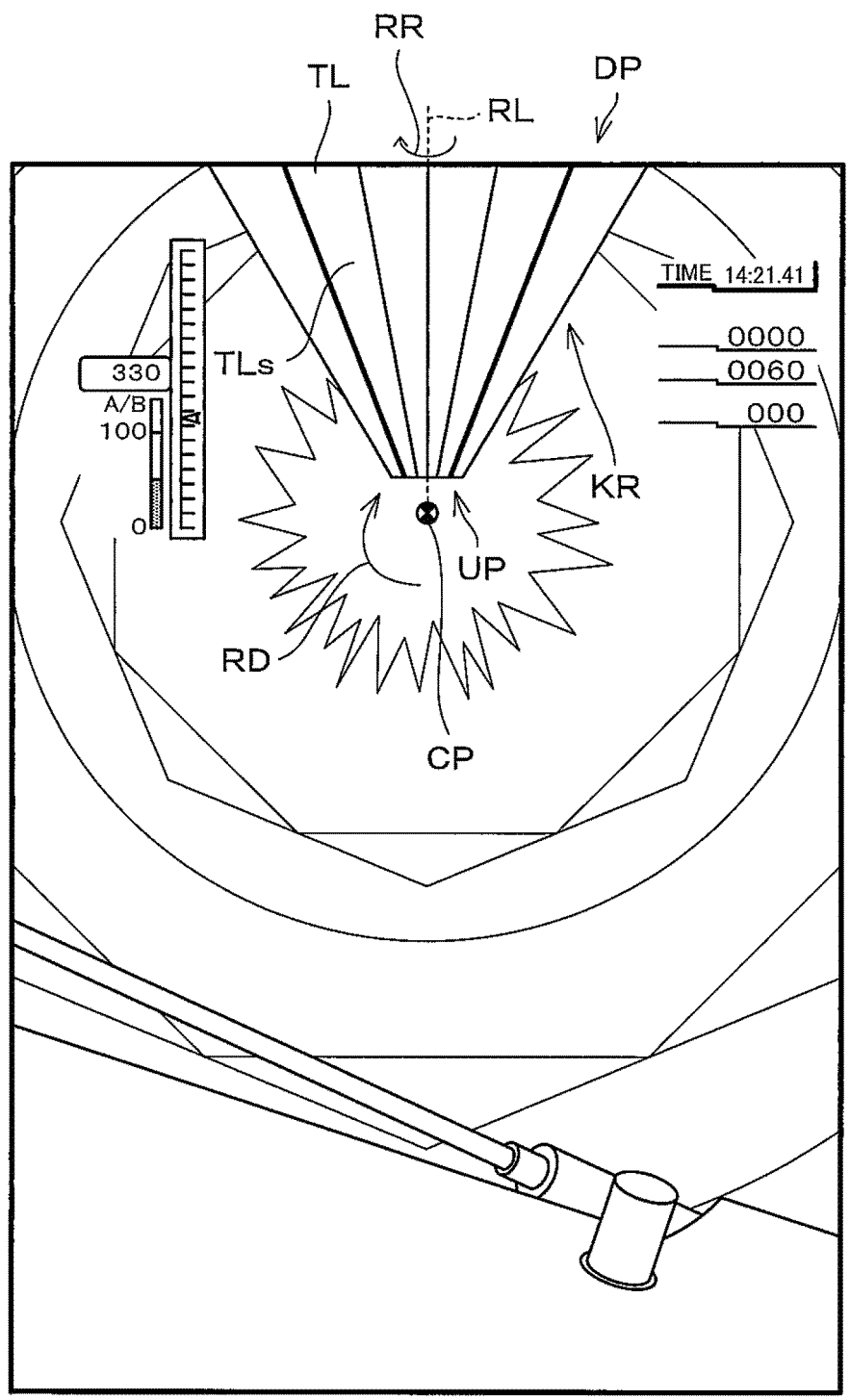
FIG. 9 is a diagram illustrating a game screen after a predetermined time elapsed from the state of FIG. 8.

FIG. 9 is a diagram illustrating a state in which a predetermined time further elapsed from the state of FIG. 8 and then the track TL rotates a half turn. As illustrated in FIG. 9, in a state in which the track TL rotates a half turn, the path display area KR is arranged above the predetermined center position CP. In other words, movement of about 90° in the clockwise direction RD is further made from the position of the path display area KR of FIG. 8. Further, the track TL remains rotated on the rotation axis RL in the right rotation direction RR about 90° from the state of FIG. 8, that is, at about 180° from the state of FIG. 7. Thus, the surface TLs of the track TL faces the predetermined center position side, that is, faces downward even in a state which a half turn is made.

Figure 10:
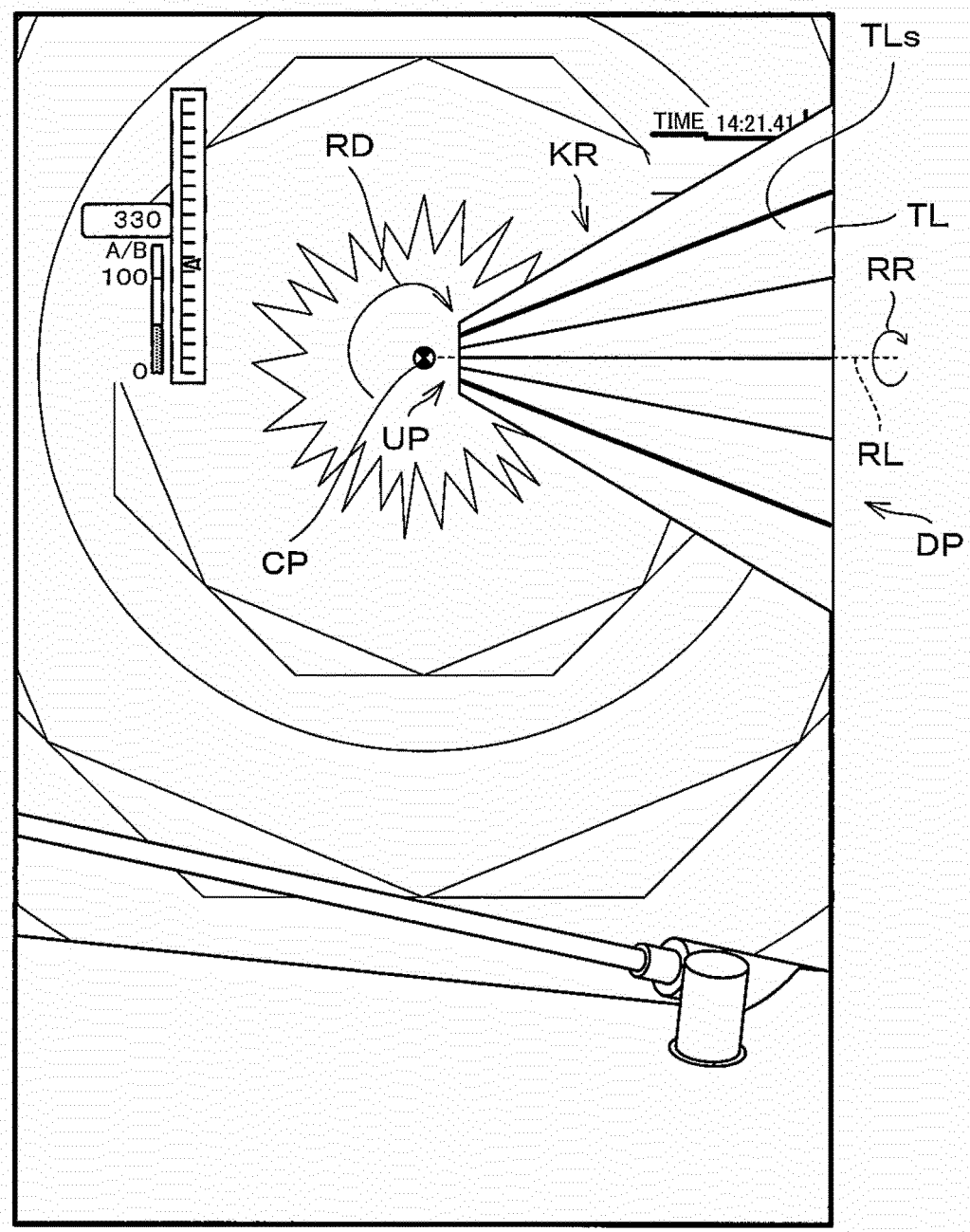
FIG. 10 is a diagram illustrating a game screen after a predetermined time elapsed from the state of FIG. 9.

Further, FIG. 10 is a diagram illustrating a state of the track TL after a predetermined time elapsed from the state of FIG. 9. As illustrated in FIG. 10, the path display area KR further rotates on the rotation axis RL about 90° in the right rotation direction RR from the half-turn state of FIG. 9. Further, with the rotation, the path display area KR moves 90° in the clockwise direction RD from the state of FIG. 9 so as to rotate around the predetermined center position CP and thus is arranged at the right side of the predetermined center position CP. In other words, the path display area KR is inclined in the opposite direction to the state of FIG. 8 with the predetermined center position CP interposed therebetween, and arranged at the position in which the surface TLs of the track TL faces the predetermined center position CP side positioning at the left side. Thus, even in this case, the surface TLs of the track TL faces the predetermined center position CP side.

When a predetermined time elapses from the state of FIG. 10, the path display area KR including the track TL returns to the original state before rotation starts, that is, the state of FIG. 7. As described above, a timing in which the path display area KR rotates on the rotation axis RL once matches a timing in which the path display area KR rotates around the predetermined center position CP once and returns to the original position. In other words, the path display area KR performs rotation and orbiting movement so that a rotational angle at which the path display area KR rotates on the rotation axis RL can match a movement angle at which the path display area KR orbits the predetermined center position CP. Further, an orbiting direction of orbiting movement and a rotating direction of rotation are the same direction, that is, the clockwise direction. In other words, the orbiting direction and the rotating direction are in a correspondence relation. As a result, the path display area KR rotates in the orbiting direction while moving around the predetermined center position CP so that the surface TLs of the track TL constantly faces the predetermined center position CP side.

Meanwhile, elements (including functions) of changing music which is being reproduced are allocated to the volume controllers 9A and 9B, respectively. For example, a guitar sound and a vocal sound are allocated to the left volume controller 9A of the area 3A and the right volume controller 9B, respectively, as the elements for changing music. And, the volumes of the guitar sound and the vocal sound change in response to rotational operation on the volume controllers 9A and 9B, respectively.

In addition, for example, an effector function may be allocated to the volume controller 9. Specifically, an effect level on music may change in response to the rotational operation on the volume controller 9. As such an effect, for example, a change of enhancing a sound of a specific frequency band on an original sound source of music may be implemented. In this case, a frequency band to be enhanced may increase or decrease in response to the rotational operation on the volume controller 9.

Alternatively, a scratch function, that is, a function of increasing or decreasing a reproduction speed of music may be allocated to the volume controller 9. Specifically, a scratch effect corresponding to an increment in the reproduction speed and a scratch effect corresponding to a decrement in the reproduction speed may be caused in music in response to the rotational operation on the volume controller 9. Further, a predetermined sound effect may be allocated to the button 13. In other words, as the button 13 is pushed down, a predetermined sound effect may be added to the middle of music.

Figure 11:
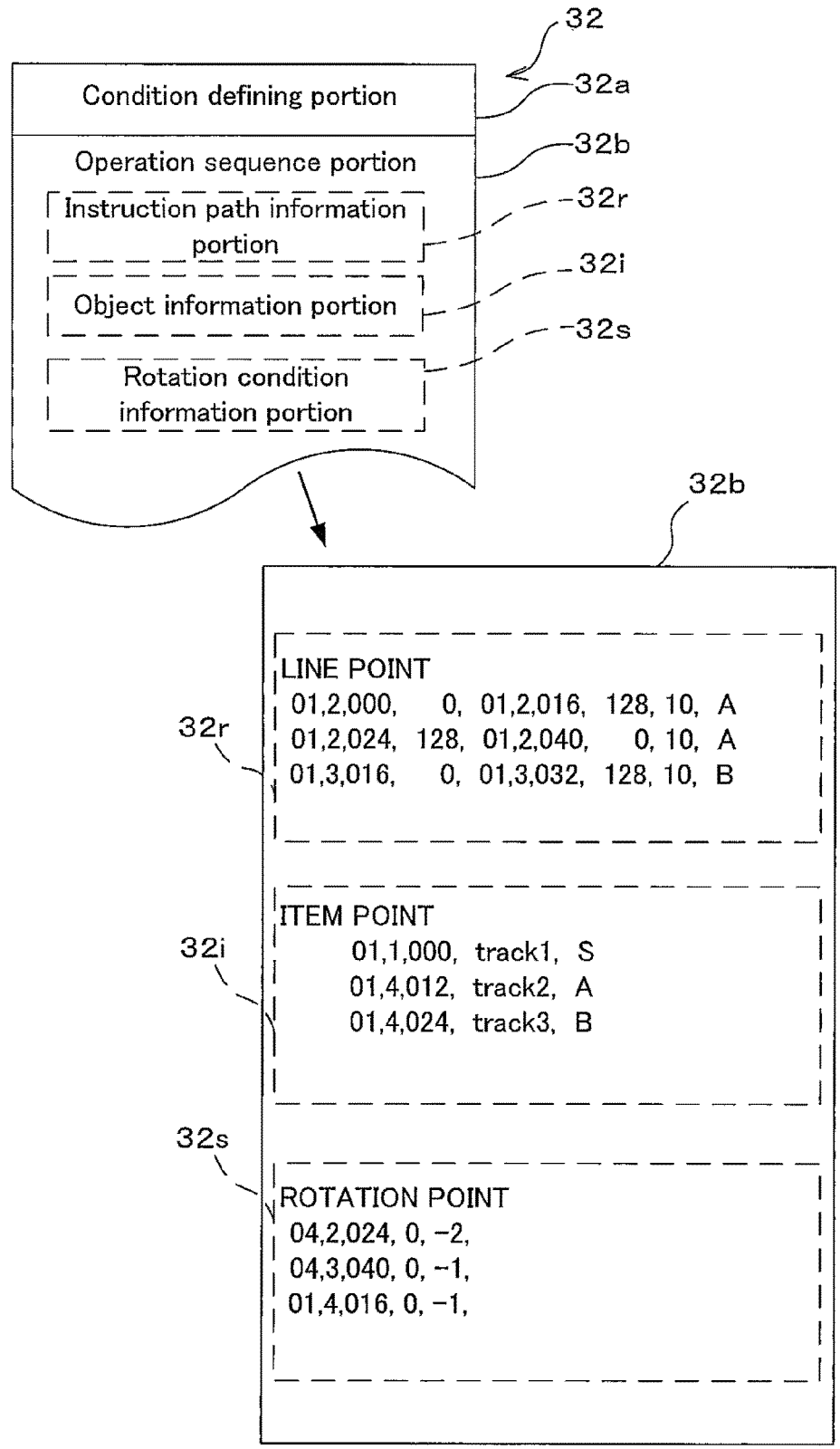
FIG. 11 is a diagram illustrating an example of content of sequence data.

Next, the details of the sequence data 32 will be described with reference to FIG. 11. FIG. 11 is a diagram illustrating an example of content of the sequence data 32. As illustrated in FIG. 11, the sequence data 32 includes a condition defining portion 32a and an operation sequence portion 32b. Information designating various conditions to play a game such as the tempo of music, beat, a track, and the length of music is described in the condition defining portion 32a.

Meanwhile, an instruction of an operation on the button 13 and the volume controller 9 is described in the operation sequence portion 32b in association with a time in music. Further, for example, an instruction of timing and the like to rotate the path display area KR is also included in the operation sequence portion 32b. As illustrated in FIG. 11, the operation sequence portion 32b includes an instruction path information portion 32r used for forming the instruction path R, an object information portion 32i used for arranging the object OJ or the large object DJ on the track TL, and a rotation condition information portion 32s used for instruction of timing and a condition to rotate the path display area KR.

The instruction path information portion 32r includes information of timing (reference timing) in music, information of the position (position information) on the reference line KL extending in the left-right direction (the second direction) crossing the time axis direction (the depth direction TD) as the position in the crossing direction, information of the width of the instruction path R, and information of an instruction path pattern. The instruction path information portion 32r is configured as a set of a plurality of records in which these pieces of information are associated with each other. In the example of FIG. 11, information of timing in music at which the instruction path R starts, that is, information of start timing, information of the position on the reference line KL at the start timing of the instruction path R, information of timing in music at which the instruction path R ends, that is, information of end timing, information of the position on the reference line KL at the end timing of the instruction path R, information of the width of the instruction path R, and information of an instruction path pattern are described from the left in the described order. Further, "LINE POINT" is described at the beginning of the instruction path information portion 32r. The instruction path information portion 32r is distinguished from other information portions such as the object information portion 32i or the rotation condition information portion 32s by this description.

Information of the reference timing such as the start timing and the end timing is described such that a bar number in music, beats, and a value representing a time in a beat are separated by a comma. A time in a beat refers to an elapsed time from the head of one beat, and is represented by the number of units from the head obtained by equally dividing the length of one beat into n unit times. For example, as the reference timing, there is described "01,2,025" when a time, in which n is 100 and ¼ has elapsed from the head of a second beat in a second beat of a first bar of music, is designated.

Information of the position on the reference line KL is described using a numerical value representing each position in the left-right direction in which the reference line KL extends. For example, as a numerical value representing each position, there is used a number (a number of a unit length) when the length of the reference line KL in the left-right direction is equally divided by a predetermined number, and positions respectively corresponding to the divided unit lengths (unit ranges) are numbered in order from the left end. In the example of FIG. 11, 128 is used as the predetermined number. Further, positions are numbered in order up to 128 at the position of the right end, like 0, 1, and 2, from the position of the left end of the reference line KL to the position of the right end thereof. In other words, when the position of the left end of the reference line KL is designated, a numerical value of 0 is described, and when the position of the right end is designated, a numerical value of 128 is described. In addition, information of the reference line KL means that when the reference timing corresponding to the information comes, the instruction path R is arranged at the position on the reference line KL which is designated by the numerical value. In other words, information of the reference line KL means the position of a portion overlapping the instruction path R on the reference line KL. Further, before the reference timing comes, information of the position on the reference line KL functions as a designation of each position on the track TL or the spare track YT, in the left-right direction which corresponds to the position on the reference line KL in the left-right direction.

Information of the position on the reference line KL functions as information designating the volume controller 9. Specifically, when the position on the reference line KL associated with the end timing corresponds to the position of the right end, it functions as information designating the right volume controller 9B, whereas when the position on the reference line KL associated with the end time corresponds to the position of the left end, it functions as information designating the left volume controller 9A. In addition, the left and right volume controllers 9A and 9B may be designated using a description of the beginning of the instruction path information portion 32r. For example, when a description of the beginning is "LINE POINT1," it may function as the instruction path information portion 32r corresponding to the left volume controller 9A, whereas when a description of the beginning is "LINE POINT2," it may function as the instruction path information portion 32r corresponding to the right volume controller 9B.

The width of the instruction path R is designated using the unit length representing each position on the reference line KL. For example, when the width of the instruction path R is described as "10," the width of the length corresponding to 10 unit lengths is designated. The instruction path pattern is designated using an alphabet associated with each instruction path pattern. For example, "A" is associated with a pattern of an X type corresponding to the example of FIG. 5, and "B" is associated with the other patterns. And, when the pattern of the X type corresponding to the example of FIG. 5 is designated, "A" is described as the instruction path pattern. In addition, a correspondence between the instruction path pattern and an alphabet is implemented by a separate table (not illustrated).

In the example of FIG. 11, a start point in time ("000") of a second beat of a first bar is designated as the start timing, and a time in which "016" elapsed from the start point in time of the second beat of the first bar is designated as the end timing. And, the position ("0") of the left end of the reference line KL is designated as the position of the start timing, and the position ("128") of the right end of the reference line KL is designated as the position of the end timing. Further, "10" is designated as the width of the instruction path R, and "A", that is, the X type is designated as the pattern. Thus, the instruction path R in which a letter X is drawn with the width of "10" is displayed such that it starts to reach the position of the left end of the reference line KL at the start point in time ("000") of the second beat of the first bar, and it ends at the position of the right end at timing in which "016" has elapsed from the start point in time of the second beat of the first bar.

Meanwhile, the object information portion 32*i* includes information of timing in music, track information designating any one of the four tracks TL, and object information designating the type of object. The object information portion 32*i* is configured as a set of a plurality of records in which these pieces of information are associated with each other. In the example of FIG. 11, the information of timing in music, the track information, and the object information are described from the left in the described order. Further, "ITEM POINT" is described at the beginning of the object information portion 32*i*, and the object information portion 32*i* is distinguished from other information portions such as the instruction path information portion 32*r* or the rotation condition information portion 32*s* through this description.

The information of timing in music is described similarly to the instruction path information portion 32*r*. This timing corresponds to timing at which an object is to arrive at the reference line KL. In other words, this timing functions as a designation of an operation timing at which an appropriate operation is to be performed. The track information is described using information designating the four tracks TL. For example, the tracks are numbered as 1, 2, 3, and 4 in order starting from the track TL of the left end. When the track TL of the left end is designated, information of "track 1" is described, and when the track TL adjacent thereto is designated, information of "track 2" is described. The object information is described using an alphabet associated with the object OJ or the large object DJ. For example, "S" is associated with the object OJ. Further, depending on the position of the track TL to appear, the large object DJ is associated with "A" when the large object DJ straddles the two tracks TL at the left side and "B" when the large object DJ straddles the two tracks TL at the right side. In addition, the type of large object DJ is associated with any other alphabet, depending on the length thereof or the like.

In the example of FIG. 11, an instruction is described to display the object OJ ("S") that moves on the track TL ("track 1") of the left end to arrive at the reference line KL at the start point in time ("000") of the first beat of the first bar. Meanwhile, an instruction is also described to display the large object DJ that straddles the two tracks TL of the left side and moves to arrive at the reference line KL at timing in which "0012" has elapsed from the stat point in time of the first beat of the first bar.

The rotation condition information portion 32*s* includes rotation timing information representing rotation timing at which rotation starts, execution condition information representing an execution condition that is to be satisfied to start rotation, and rotation type information as rotating direction information representing the type of rotation such as a rotating direction. The rotation condition information portion 32*s* is configured as a set of a plurality of records in which these pieces of information are associated with each other. In the example of FIG. 11, the rotation timing information, the execution condition information, and the rotation type information are described from the left in the described order. Further, "ROTATION POINT" is described at the beginning of the rotation condition information portion 32*s*. The rotation condition information portion 32*s* is distinguished from other information portions such as the instruction path information portion 32*r* or the object information portion 32*i* through this description.

In the rotation timing information, rotation timing at which rotation starts is described similarly to the information of the reference timing of the instruction path information portion 32*r*. In other words, a bar number in music, beats, and a value representing a time in a beat are described to be separated by a comma. A number such as "0" and "1" representing the execution condition is described in the execution condition information. This number is associated with a concrete condition. For example, "0" is associated with a condition that an appropriate operation is executed on the object OJ, and "1" is associated with a condition that an appropriate operation (an operation of moving the cursor KG not to be led astray outside the instruction path R) is executed on the instruction path R. For example, this correspondence may be implemented by a table (not illustrated). The execution condition can be specified based on a number described as execution condition information using this table. The sequence data 32 functions as rotation timing data of the present invention by including the rotation timing information. Further, the sequence data 32 functions as the execution condition data of the present invention by including the execution condition information.

The rotation type information is described as by a symbol in which a minus sign is combined with a number such as "−1" or "−2". This symbol is associated with the type of concrete rotation. For example, "−1" is associated with the type of rotation in which clockwise rotation (right rotation) is performed once, and "−2" is associated with the type of rotation in which counterclockwise rotation (left rotation) is performed once. For example, this correspondence may be implemented by a table (not illustrated). A rotating direction or a rotation angle can be specified based on the symbol described as the rotation type information using this table. Further, the rotating direction in which the path display area KR rotates and the orbiting direction in which the path display area KR orbits the predetermined center position CP are in the correspondence relation. For this reason, the rotation type information corresponds to a designation of the orbiting direction. Specifically, when clockwise rotation is designated, the rotation type information corresponds to a designation of right rotation as the orbiting direction, whereas when counterclockwise rotation is designated, the rotation type information corresponds to a designation of left rotation. The rotation type information functions as rotating direction information by including information designating the rotating direction. Further, the rotation type information functions as angle specifying information by including information designating a rotation angle such as single rotation. Thus, the sequence data 32 functions as rotating direction data and angle specifying data by including the rotation type information like this.

In addition, the symbol used as the rotation type information is not limited to a symbol in which a minus sign is combined with a number. For example, a simple number such as "1" may be used. Further, the rotation angle is not limited to single rotation. For example, an angle such as half rotation, ¼ rotation, or 30° rotation may be used as the rotation angle. The rotation angle may be designated by a symbol in which the rotating direction is associated with the rotation angle, for example, such that "−3" designates clockwise half rotation. Alternatively, the rotation angle information representing the rotation angle may be included in the rotation condition information portion 32*s* separately from the rotation type information. In this case, the rotation angle information functions as the angle specifying information. Each number associated with the rotation angle such as single rotation, half rotation, or ¼ rotation is described as the rotation angle information. In this case, the rotation type information may be used to specify only the rotating direction such as clockwise rotation or counterclockwise rotation. Furthermore, the rotation angle information and the rotation type information may function as a designation of orbiting movement at the same angle in the same direction. Alternatively, information for specifying a designation related to orbiting movement such as the orbiting direction may be separately provided.

In the example of FIG. 11, timing in which "024" has elapsed from start timing of a second beat of a fourth bar is designated as start timing. And, a condition that an appropriate operation is performed on the object OJ is designated as the execution condition at this timing. Further, single counterclockwise rotation (left rotation) is designated as the type of rotation at this time. Thus, in this example, an instruction of rotation is described to represent that the path display area KR rotates once counterclockwise (rotates right) at timing in which "024" has elapsed from the start timing of the second beat of the fourth bar when an appropriate operation is performed on the object OJ.

Based on the sequence data 32, the game control unit 16 executes various processes such as a process of displaying the instruction path R, a process of displaying the object OJ or the large object DJ, and a process of rotating the path display area KR. By executing the processes, the game control unit 16 controls a display of the instruction path R, the object OJ, and the large object DJ so that the instruction path R, the object OJ, and the large object DJ can match the reference line KL at the reference timing designated by the sequence data 32. Further, when an appropriate operation is performed at an appropriate timing, the game control unit 16 rotates the path display area KR including the track TL.

Next, a process of executing a music game through the game control unit 16 will be described. The game control unit 16 reads the game program 21 and performs initial setting necessary to execute a music game, and then is on standby for a game start instruction from the player. For example, the game start instruction includes an operation specifying data used in a game such as selection of a song to be played in a game or a difficulty level. A procedure for receiving this instruction may be the same as in a well-known music game.

When a game start is instructed, the game control unit 16 causes the speaker 4 to start reproducing the music by reading the music data 29 corresponding to music selected by the player and outputting the read music data 29 to the audio output control unit 18. Through this operation, the control unit 15 functions as music reproducing device.

Furthermore, the game control unit 16 reads the sequence data 32 corresponding to the player's selection in synchronization with reproduction of music, generates image data necessary for rendering a game screen with reference to the image data 31, and outputs the generated image data to the display control unit 17. Through this operation, the game control unit 16 causes the monitor 2 to display the game screen. Further, as processes necessary to display the game screen or the like during execution of the music game, the game control unit 16 repeatedly executes an instruction path display process routine illustrated in FIG. 12, a cursor display process routine illustrated in FIG. 13, a cursor position control process routine illustrated in FIG. 14, a path rotation process routine illustrated in FIG. 15, and an operation evaluation routine illustrated in FIG. 16 at a predetermined period. In addition, the sequence processing unit 26 handles the routine of FIG. 12, the routine of FIG. 13, and the routine of FIG. 14, the route control unit 28 handles the routine of FIG. 15, and the operation evaluating unit 27 handles the routine of FIG. 16. Besides, the game control unit 16 executes processes such as a process of controlling a display of the object OJ or the large object DJ in addition to the above processes, but this process is implemented by a well-known process, and so the details of these processes will not be described.

Figure 12:
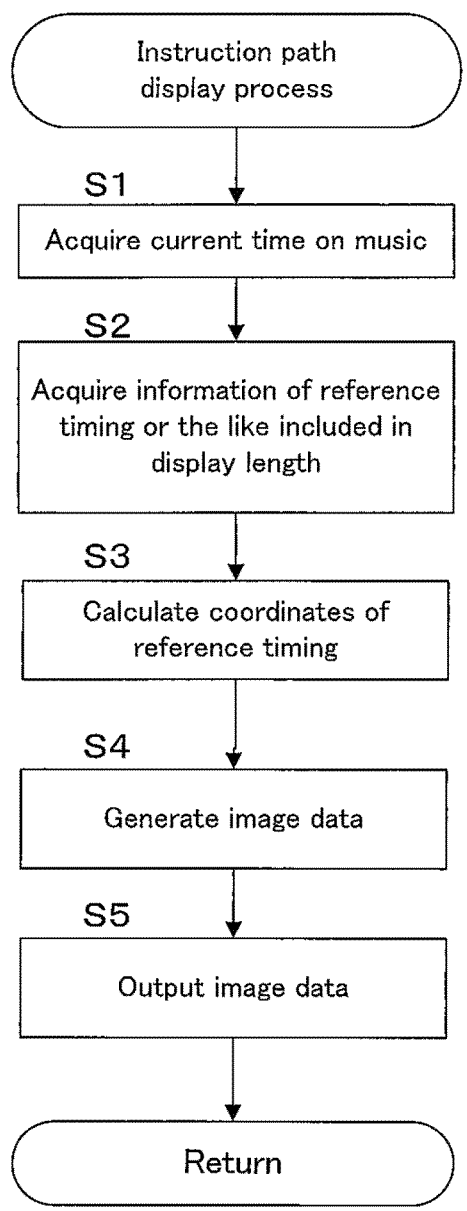
FIG. 12 is a diagram illustrating an example of a flowchart of an instruction path display process routine.

When the instruction path display process routine of FIG. 12 starts, in step S1, the sequence processing unit 26 of the game control unit 16 first acquires a current time on music. For example, clocking starts by an internal clock of the game control unit 16 from a reproduction start point in time of music, and the current time is acquired based on a value of the internal clock. Subsequently, in step S2, the sequence processing unit 26 acquires each information such as a reference timing (a start timing and an end timing), the position on the reference line KL, the width, and a pattern of the instruction path information portion 32r included in a time length (a predetermined display range) to be displayed on a game screen from the sequence data 32. For example, the predetermined display range is set to a time length of about two bars of music from the current time.

Next, in step S3, the sequence processing unit 26 calculates coordinates, on the game screen, corresponding to each reference timing (each of the start timing and the end timing) included within the display range acquired in step S2. For example, this calculation is performed as follows. First, the sequence processing unit 26 determines the volume controller 9 which is associated with the instruction path R included in the display range. This determination is performed based on the position on the reference line KL designated as the end timing of the instruction path R. For example, it is determined that the instruction path R is associated with the right volume controller 9B when the position of the right end on the reference line KL is designated as the end timing, whereas it is determined that the instruction path R is associated with the right volume controller 9A when the position of the left end on the reference line KL is designated as the end timing. Next, the position of each piece of reference timing in the time axis direction (that is, the depth direction TD) from the position of the reference line KL is determined based on a temporal difference between each piece of reference timing and the current time. Furthermore, the position in the left-right direction at each piece of reference timing is determined based on information of the position on the reference line KL associated with each piece of reference timing or the like. Thus, it is possible to acquire coordinates of each designated position in the left-right direction corresponding to each piece of reference timing designated by an arrangement of a time order along a time axis from the position of the reference line KL.

When a calculation of coordinates corresponding to each piece of reference timing is completed, the sequence processing unit 26 proceeds to step S4. In step S4, the sequence processing unit 26 generates image data necessary to render the instruction path R based on the coordinates of the reference timing calculated in step S3 and each piece of information acquired in step S2. This image data is generated based on the coordinates of each reference timing (the start timing, the end timing), the information of the width of the instruction path R, and the information of the instruction path pattern, which are included in the instruction path information portion 32r. Specifically, the sequence processing unit 26 generates the image data for displaying the instruction path R in which the coordinates of the start timing are connected to the coordinates of the end timing according to the instruction path pattern so that the instruction path R can have a designated width. Thus, generated is image data for displaying the instruction path R extending in the time axis direction according to the designated instruction path pattern while passing through the designated position in the left-right direction in the time order of each piece of reference timing, that is, in the order of the start timing and the end timing.

Subsequently, in step S5, the sequence processing unit 26 outputs the image data generated in step S4 to the display control unit 17, and ends the current routine. The above process is repeatedly executed, and so the instruction path R extending in the depth direction TD while passing through a predetermined position in the left-right direction at the reference timing described in the sequence data 32 is displayed on the game screen. Further, the instruction path R is moved and displayed in the depth direction TD so that the position corresponding to each piece of reference timing of the instruction path R can match the position of the reference line KL at the current time.

Figure 13:
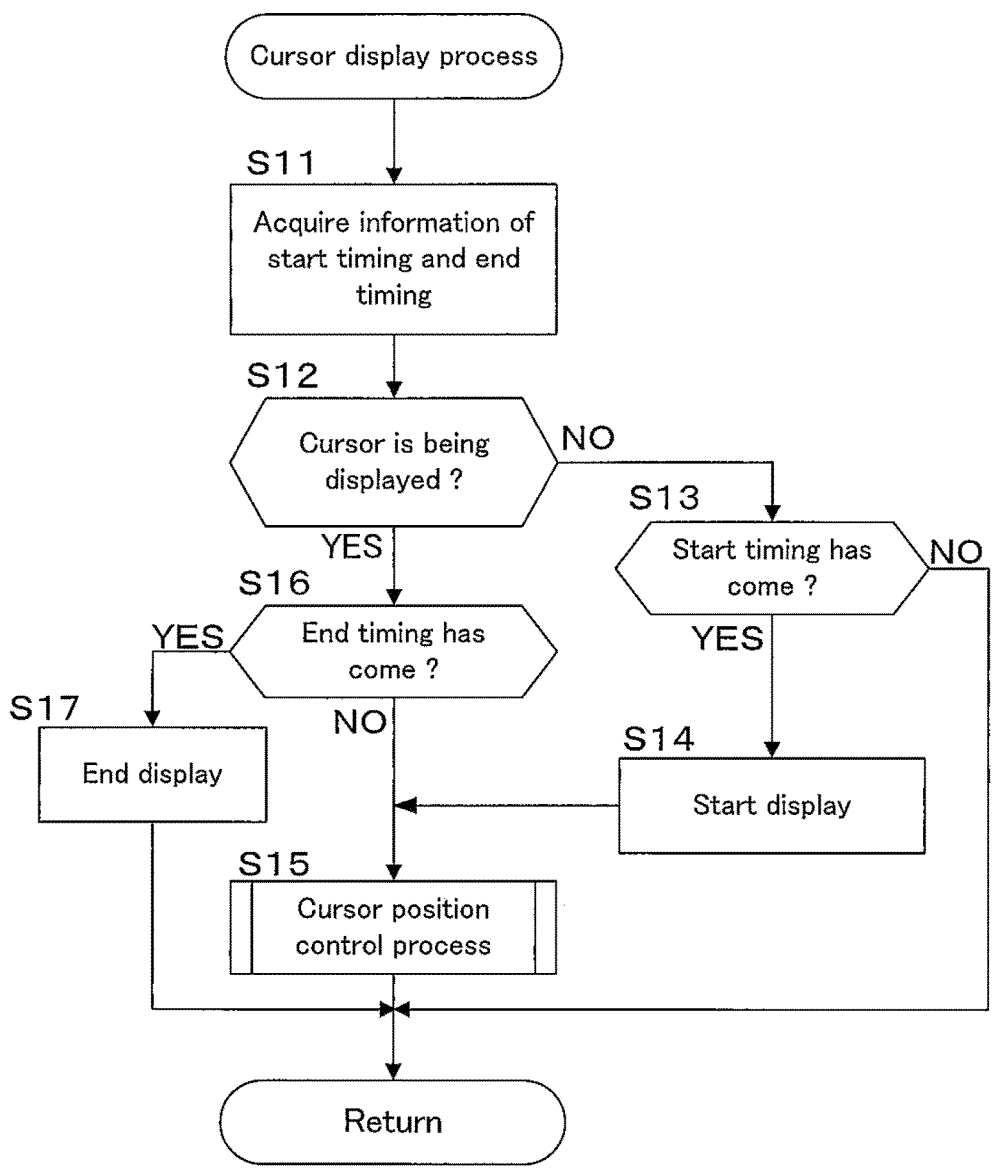
FIG. 13 is a diagram illustrating an example of a flowchart of a cursor display process routine.

Next, a cursor display process routine of FIG. 13 will be described. The routine of FIG. 13 is a process for controlling a display of the cursor KG on the reference line KL. When the routine of FIG. 13 starts, in step S11, the sequence processing unit 26 acquires information of the start timing and the end timing of the instruction path R included in the display range from the instruction path information portion 32*r* of the sequence data 32. Subsequently, in step S12, the sequence processing unit 26 determines whether or not the cursor KG is being displayed on the game screen, that is, determines the presence or absence of a display of the cursor KG.

When a determination result of step S12 is a negative result, that is, when it is determined that the cursor KG is not displayed on the game screen, the sequence processing unit 26 proceeds to step S13. In step S13, the sequence processing unit 26 determines whether or not the current time is the start timing based on the information acquired in step S11, that is, determines whether or not the start timing of the instruction path R has come. When a determination result is negative, that is, when the start timing has not come, the sequence processing unit 26 skips subsequent processes, and ends the current routine.

In contrast, when the determination result of step S13 is positive, that is, when the start timing has come, the sequence processing unit 26 proceeds to step S14. In step S14, the sequence processing unit 26 starts to display the cursor KG at a predetermined position, and then proceeds to step S15. Further, a portion overlapping the instruction path R on the reference line KL is used as the predetermined position. In step S15, the sequence processing unit executes a sub routine of a cursor position control process. The details of the sub routine will be described later. When the process of step S15 ends, the sequence processing unit 26 ends the current routine.

Meanwhile, when the determination result of step S12 is positive, that is, when it is determined that the cursor KG is already being displayed on the game screen, the sequence processing unit 26 proceeds to step S16. In step S16, the sequence processing unit 26 determines whether or not the current time is the end timing based on the information acquired in step S11, that is, determines whether or not the end timing of the instruction path R has come. When this determination result is negative, that is, when the end timing has not come, the sequence processing unit 26 proceeds to step S15.

In step S15, the sequence processing unit 26 executes the sub routine of the cursor position control process, and then ends the current routine. In contrast, when the determination result of step S16 is positive, that is, when the end timing has come, the sequence processing unit 26 proceeds to step S17. In step S17, the sequence processing unit 26 erases a display of the cursor KG from the game screen, that is, ends a display of the cursor KG, and then ends the current routine.

Figure 14:
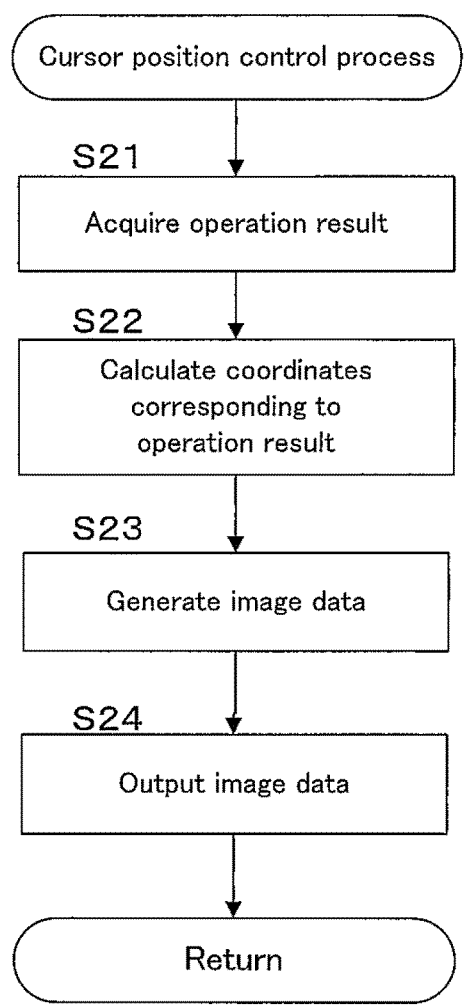
FIG. 14 is a diagram illustrating an example of a flowchart of a cursor position control process routine.

FIG. 14 is a diagram illustrating an example of a flowchart of the cursor position control process routine. This routine is called in step S15 of the routine of FIG. 13 as a sub routine of the routine of FIG. 13, and then executed. When the routine of FIG. 14 starts, in step S21, the sequence processing unit 26 first acquires the player's operation result on the volume controller 9. Specifically, the rotating direction and the rotation amount of each volume controller 9 are acquired with reference to an output signal of the detecting device 35 as the player's operation result.

Subsequently, in step S22, the sequence processing unit 26 calculates coordinates of the cursor KG corresponding to the operation result based on each operation result acquired in step S21. Specifically, coordinates of the cursor KG to be displayed are calculated as a movement destination corresponding to the operation result. For example, the coordinates are calculated as follows. First, the sequence processing unit 26 determines a direction to move the cursor KG based on the acquired rotating direction. Specifically, a right direction is determined as a direction to move when a clockwise rotation operation is performed on the volume controller 9, whereas a left direction is determined as a direction to move when a counterclockwise rotation operation is performed on the volume controller 9. Next, a movement amount is determined based on the rotation amount. This determination is made such that a determination range is set to a part of a range (for example, 360°) in which the volume controller 9 is rotatable. Specifically, first, an angle set as the determination range is equally divided by a predetermined number (a number in common with information of the position of the reference line KL), so that a unit angle is calculated. Next, the rotation amount, that is, the rotation angle is replaced with a quantity of a unit angle. Then, a unit length corresponding to this quantity is calculated as the movement amount. The coordinates of the cursor KG to be displayed are calculated as a movement destination, based on the moving direction, the movement amount (the moving distance), and the current coordinates of the cursor KG (a predetermined position when a display starts) which are calculated in the above-described way.

Next, in step S23, the sequence processing unit 26 generates image data necessary to render the cursor KG based on the coordinates calculated in step S22. Specifically, image data used to display the cursor KG at the coordinates of the movement destination calculated in step S22 is generated. Subsequently, in step S24, the sequence processing unit 26 outputs the image data to the display control unit 17, and then ends the current routine. As the above process is executed, the cursor KG is displayed on the reference line KL, and the cursor KG moves on the reference line KL in response to an operation on the volume controller 9.

Figure 15:
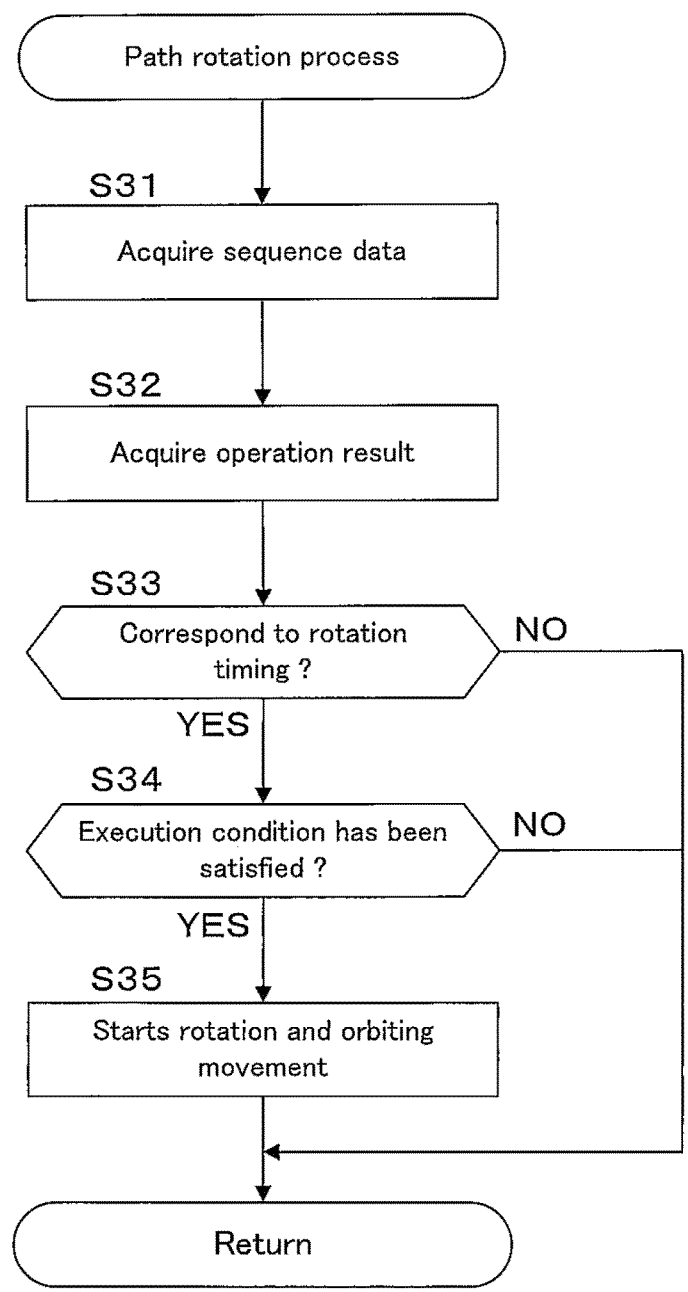
FIG. 15 is a diagram illustrating an example of a flowchart of a path rotation process routine.

Next, a path rotation process routine of FIG. 15 will be described. The routine of FIG. 15 is a process for rotating the path display area KR. When the routine of FIG. 15 starts, in step S31, the route control unit 28 first acquires various pieces of information of the sequence data 32. Specifically, the route control unit 28 acquires various pieces of information of the rotation condition information portion 32*s* from the sequence data 32. In addition, at this time, the route control unit 28 may acquire all information of the rotation condition information portion 32*s* or may acquire each piece of information corresponding to the rotation timing, at which rotation should be started, included in a predetermined time range. Further, when rotation is executed on condition of a specific operation, in order to determine whether or not the execution condition has been satisfied, information of a timing (operation timing) in music in the object information portion 32*i* may be acquired.

Next, in step S32, the route control unit 28 acquires an operation result of the player with reference to the output signal of the detecting device 35. For example, with reference to the output signal of the detecting device 35, the route control unit 28 acquires the operation result such as the button 13 whose operation is performed and a timing at which the operation is performed. Further, at this time, the operation result included in a predetermined evaluation time using the current time as a reference may be acquired. For example, a time until a predetermined time prior to the current time using the current time as a reference, or a predetermined time before or after the current time may be employed as the predetermined evaluation time. Subsequently, in step S33, the route control unit 28 determines whether or not the current time corresponds to the rotation timing at which rotation should be started based on the information of the rotation timing of the sequence data 32 acquired in step S31. For example, the internal clock of the game control unit 16 is clocked using a reproduction start point in time of music, and the current time is acquired from a value of the internal clock. When this determination result is negative, that is, when the current time does not correspond to the rotation timing, the route control unit 28 skips subsequent processes, and ends the current routine.

In contrast, when the determination result of step S33 is positive, that is, when the current time corresponds to the rotation timing, the route control unit 28 proceeds to step S34. In step S34, the route control unit 28 determines whether or not the execution condition to execute rotation has been satisfied within a predetermined evaluation time range based on the rotation condition information portion 32*s* of the sequence data 32 acquired in step S31 and the operation result acquired in step S32. In further detail, the execution condition corresponding to the rotation timing which corresponds to the current time is specified, and it is determined whether or not the specified execution condition has been satisfied within a predetermined evaluation time range. At this time, using timing in music in the object information portion 32*i*, there may be determined whether or not actual operation timing is appropriate operation timing. For example, in the case in which the specified execution condition is "0," when an appropriate operation is executed on the object OJ, the execution condition is satisfied, whereas when an appropriate operation is not executed, the execution condition is not satisfied. When this determination result is negative, the route control unit 28 skips subsequent processes, and then ends the current routine.

In contrast, when the determination result of step S34 is positive, the route control unit 28 proceeds to step S35. In step S35, the route control unit 28 starts rotation of the path display area KR and orbiting movement of orbiting the predetermined center position CP. At this time, the route control unit 28 executes the rotation and the orbiting movement at a designated angle in a designated direction based on the rotation type information of the sequence data 32. The rotation and the orbiting movement of the path display area KR may be implemented using a well-known technique. When the process of step S35 ends, the route control unit 28 ends the current routine. Thus, the rotation and the orbiting movement of the path display area KR are implemented based on a designation of the sequence data 32.

Figure 16:
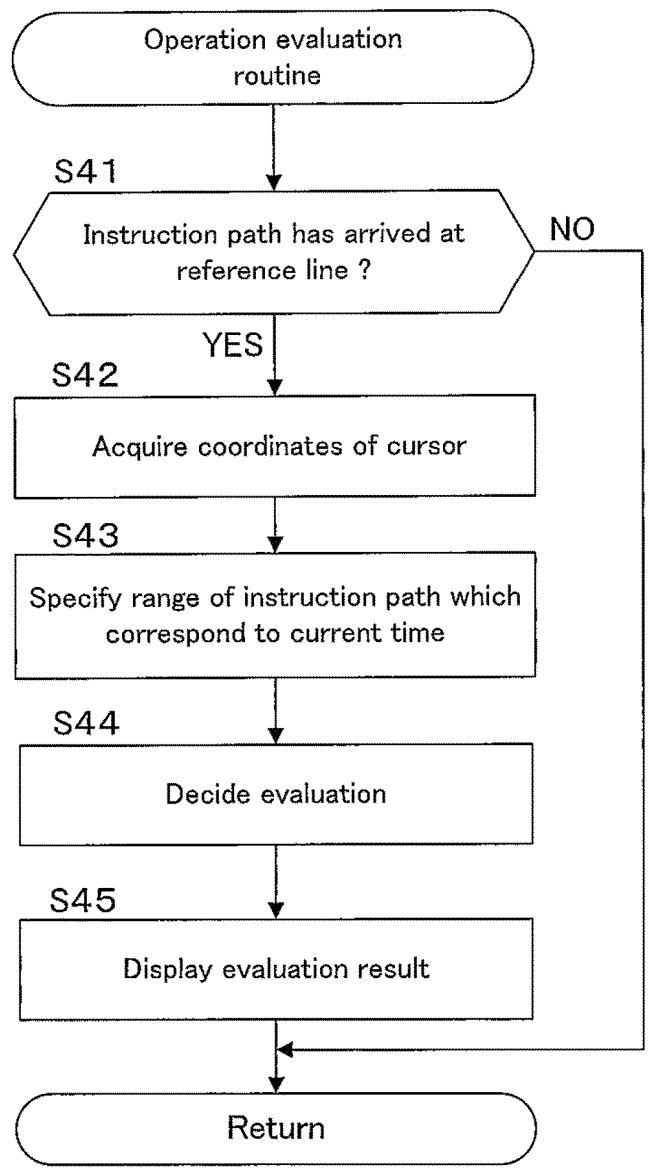
FIG. 16 is a diagram illustrating an example of a flowchart of an operation evaluation routine.

Next, an operation evaluation routine of FIG. 16 will be described. The routine of FIG. 16 is a process for evaluating the player's operation on the volume controller 9. Further, the routine of FIG. 16 is executed for each display path R, that is, for each volume controller 9. When the routine of FIG. 16 starts, in step S41, the operation evaluating unit 27 first determines whether or not the instruction path R has arrived at the reference line KL. For example, this determination is implemented by comparing the current time with the start timing and the end timing of the instruction path R. Specifically, when the current time is a time between the start timing and the end timing, it is determined that the instruction path R has arrived at the reference line KL, and otherwise, it is determined that the instruction path R has not arrived at the reference line KL. Then, when this determination result is negative, the operation evaluating unit 27 skips subsequent processes, and then ends the current routine.

In contrast, when the determination result of step S41 is positive, that is, when the instruction path R has arrived at the reference line KL, the operation evaluating unit 27 proceeds to step S42. In step S42, the operation evaluating unit 27 acquires coordinates of the cursor KG on the reference line KL. This coordinates may be acquired using the processing result of FIG. 14 or may be acquired by the same process at step S22 of FIG. 14.

Subsequently, in step S43, the operation evaluating unit 27 specifies a range of the instruction path R on the reference line KL, which corresponds to the current time. For example, this specification is performed as follows. First, a time elapsed from the start timing is calculated by comparing the start timing of the instruction path R with the current time. Next, coordinates of the left end of the instruction path R and coordinates of the right end thereof on the reference line KL at the elapsed time are calculated based on information of the width of the instruction path R and information of a connection pattern. By calculating the coordinates of both ends of the instruction path R on the reference line KL in this way, a range of the instruction path R on the reference line KL, that is, an overlapping range in which the reference line KL overlaps the instruction path R is specified.

Next, in step S44, the operation evaluating unit 27 decides evaluation. For example, this decision is performed as follows. First, the operation evaluating unit 27 determines whether or not the coordinates of the cursor KG acquired in step S42 are included in the overlapping range, specified in step S43, in which the reference line KL overlaps the instruction path R. When the coordinates of the cursor KG are included in the overlapping range, the operation evaluating unit 27 decides to give a privilege (or waive a penalty) as an evaluation result. On the other hand, the coordinates of the cursor KG are not included in the overlapping range, that is, when the position of the cursor KG is outside the instruction path R, the operation evaluating unit 27 decides to give a penalty (or not to give a privilege) as an evaluation result. In this way, the operation evaluating unit 27 decides evaluation in step S44.

Subsequently, in step S45, the operation evaluating unit 27 controls an output to the display control unit 17 such that the evaluation result of step S44 is reflected in a display of the game screen. Specifically, for example, addition of a score or addition of a gauge is reflected in a display of the game screen in response to the evaluation result decided to give a privilege. On the other hand, reduction of a gauge is reflected in a display of the game screen in response to the evaluation result decided to give a penalty. When the process of step S45 ends, the operation evaluating unit 27 then ends the current routine.

Among conventional music games, there is a music game in which a predetermined path is not displayed. However, when a predetermined path is not displayed, it is difficult to time the timing to perform an operation. Thus, when a predetermined path is displayed, it is easy to play for the player. Further, there is a music game that guides the player through an operation timing using a predetermined path extending while changing in a progress direction in the middle. However, this predetermined path does not change from an initial form, that is, an initially set path. In other words, an object or the like merely moves along a fixed path. For this reason, it is easy to cause habituation or a reduction in amusement.

As described above, according to this embodiment, when a predetermined execution condition is satisfied, the path display area KR starts to rotate and orbit at the predetermined timing. The path display area KR includes the track TL. Then, the track TL is used to indicate the player's operation timing through the object OJ or the like. In other words, the path display area KR is likely to attract the player's attention. For this reason, it is possible to provide a change or a stimulus to the player through rotation and orbiting movement of the path display area KR. Thus, the player's habituation can be suppressed, and thus amusement of a game can be improved.

In the above embodiment, the control unit 15 functions as a path rotating device and a path position changing device by causing the route control unit 28 to execute the routine of FIG. 15. Further, the control unit 15 functions as an operation guide device by executing a well-known process of displaying the track TL, the reference line KL, and the object OJ, and, moving the object OJ toward the reference line KL along the track TL through the sequence processing unit 26. Further, the external storage device 20 functions as a sequence data storage device by storing the sequence data 32. Furthermore, the external storage device 20 functions a rotation timing data storage device when sequence data 32 serves as the rotation timing data, and functions as an execution condition data storage device when the sequence data 32 serves as the execution condition data, respectively. Furthermore, the external storage device 20 functions as an angle specifying data storage device when the sequence data 32 serves as the angle specifying data, and functions as a rotating direction data storage device when the sequence data 32 serves as the rotating direction data, respectively.

The present invention is not limited to the above embodiment and may be embodied in an appropriate embodiment. In the above embodiment, the object OJ is not displayed on the track TL during rotation of the path display area KR. However, the present invention is not limited to this embodiment. For example, a reference mark instructing an operation of an object or the like may be displayed on a predetermined path during rotation of the predetermined path, and the player may be requested to perform an appropriate operation even during rotation.

In the above embodiment, a predetermined path rotates once, but the rotation angle is not limited to this angle. For example, an appropriate angle such as half rotation or ¼ rotation may be employed as the rotation angle. For example, the rotation angle like these is implemented using the above-described sequence data.

In the above embodiment, a specific operation is employed as a predetermined condition to rotate a predetermined path, but the predetermined condition is not limited to this embodiment. For example, as the predetermined condition, there may be employed conditions corresponding to a game state such as a case that a predetermined option is acquired during a game, or a case that a predetermined score or more is acquired. Thus, the execution condition used in determining whether or not to rotate, the rotation timing, the rotation angle, and the like are not limited to embodiments designated by sequence data or the like. For example, the execution condition used in determining whether or not to rotate, the rotation timing, the rotation angle, and the like may be directly described in a program.

A predetermined rotation axis which a predetermined path uses as the center of rotation is not limited to an axis extending along a predetermined path. For example, an axis extending in a direction crossing a predetermined path may be used as the predetermined rotation axis. When an extending direction of the predetermined rotation axis matches an extending direction of the predetermined path, it is possible to match the extending direction of the predetermined path before and after rotation. In contrast, when the two directions do not match, since the extending direction of the predetermined path changes before and after rotation, it is possible to give a greater variation.

In the above embodiment, a music game is employed as a game executed by a game machine, but a game executed by a game machine is not limited to a music game. As long as the position of a reference portion is designated at a reference timing at which an operation is performed, various games such as a role-playing game or an action game may be executed by a game machine. Furthermore, the game system of the present invention may be implemented in a appropriate embodiment such as a game machine for business use installed in commercial facilities, a stationary game machine for home use, a portable game machine, or a game system implemented using a network.

What is claimed is:

1. A game machine comprising:
    a display that displays a game screen including a reference mark moving from a start position to an arrival position along a predetermined path is displayed on a game screen;
    a path rotating device that rotates the predetermined path to a specified angle on a predetermined rotation axis around a predetermined center position during a game based on a predetermined condition, the predetermined center position being spaced from the start position of the predetermined path;
    an input device including at least one operating unit;
    a sequence data storage device that stores sequence data to limit operation timing to perform operations on the operating unit; and
    an operation guide device that guides the operation timing by determining the operation timing included in a predetermined time range from a current time on the game to a future time based on the sequence data, displaying the reference mark in association with each determined operation timing, displaying a current time mark corresponding to the current time and the reference mark along the predetermined path on the game screen by an arrangement of a time order, and causing a relative change along the predetermined path between the reference mark and the current time mark so that a distance between the reference mark and the current time mark decreases with a decrement in a time difference between each piece of operation timing and the current time.

2. The game machine according to claim 1, further comprising a path position changing device that changes, with the rotation of the predetermined path, the position at which predetermined path is arranged so that the predetermined path moves around the predetermined center position.

3. The game machine according to claim 2, wherein the path position changing device changes the position at which the predetermined path is arranged from an original position thereof so that after the predetermined path has rotated one revolution the predetermined path is positioned at the original position from which rotation started.

4. The game machine according to claim 2, wherein the path rotating device rotates the predetermined path in a direction corresponding to an orbiting direction in which the predetermined path moves around the predetermined center position so as to orbit.

5. The game machine according to claim 1, wherein the predetermined rotation axis extends along the predetermined path.

6. The game machine according to claim 2, wherein the predetermined center position is arranged on an extension line of the predetermined path and wherein the extension line spaces the predetermined center from the start position of the predetermined path.

7. The game machine according to claim 1, further comprising a rotation timing data storage device that stores rotation timing data in which rotation timing to rotate the predetermined path is described, and wherein
the path rotating device rotates the predetermined path at the rotation timing described in the rotation timing data.

8. The game machine according to claim 1, further comprising an execution condition data storage device that stores execution condition data in which execution condition information specifying an execution condition about whether or not to rotate the predetermined path is described, and wherein
the path rotating device rotates the predetermined path using the execution condition specified by the execution condition information as the predetermined condition when the execution condition is satisfied.

9. The game machine according to claim 1, further comprising an angle specifying data storage device that stores angle specifying data, and wherein the path rotating device rotates the predetermined path to the specified angle.

10. The game machine according to claim 1, further comprising a rotating direction data storage device that stores rotating direction data in which rotating direction information specifying a rotating direction of the predetermined path is described, and wherein
the path rotating device rotates the predetermined path in a direction specified by the rotating direction information based on the rotating direction data.

11. The game machine according to claim 1, wherein a specific operation on the operating unit is employed as the predetermined condition, and
the path rotating device rotates the predetermined path when the specific operation is executed.

12. The game machine according to claim 1, further comprising:
an audio output device that reproduces and outputs a sound;
a music data storage device that stores music data to reproduce music; and
a music reproducing device that reproduces the music through the audio output device based on the music data, and wherein
timing during reproduction of the music timing is described in the sequence data as the operation timing.

13. A non-transitory storage medium storing a computer program for a game machine being configured to cause a computer, which is incorporated into a game machine with a display that displays a game screen, an input device including at least one operating unit, and a reference mark moving from a start position to an arrival position along a predetermined path is displayed on a game screen, to function as:
a path rotating device that rotates the predetermined path to a specified angle on a predetermined rotation axis around a predetermined center position during a game based on a predetermined condition, the predetermined center position being spaced from the start position of the predetermined path;
a sequence data storage device that stores sequence data to limit operation timing to perform operations on the operating unit; and
an operation guide device that guides the operation timing by determining the operation timing included in a predetermined time range from a current time on the game to a future time based on the sequence data, displaying the reference mark in association with each determined operation timing, displaying a current time mark corresponding to the current time and the reference mark along the predetermined path on the game screen by an arrangement of a time order, and causing a relative change along the predetermined path between the reference mark and the current time mark so that a distance between the reference mark and the current time mark decreases with a decrement in a time difference between each piece of operation timing and the current time.

14. A control method of controlling a computer incorporated into a game machine with a display that displays a game screen, an input device including at least one operating unit, and a reference mark moving from a start position to an arrival position along a predetermined path is displayed on a game screen, wherein the control method of controlling the computer comprises the step:
a path rotating step, wherein a path rotating device rotates the predetermined path to a specified angle on a predetermined rotation axis around a predetermined center position during a game based on a predetermined condition, the predetermined center position being spaced from the start position of the predetermined path;
a sequence data storage step, wherein a sequence data storage device that stores sequence data to limit operation timing to perform operations on the operating unit; and
an operation guide step, wherein an operation guide device that guides the operation timing by determining the operation timing included in a predetermined time range from a current time on the game to a future time based on the sequence data, displaying the reference mark in association with each determined operation timing, displaying a current time mark corresponding to the current time and the reference mark along the predetermined path on the game screen by an arrangement of a time order, and causing a relative change along the predetermined path between the reference mark and the current time mark so that a distance between the reference mark and the current time mark decreases with a decrement in a time difference between each piece of operation timing and the current time.

* * * * *